(12) United States Patent
Widhalm

(10) Patent No.: US 10,337,378 B2
(45) Date of Patent: *Jul. 2, 2019

(54) BLOCK CHANNEL GEOMETRIES AND ARRANGEMENTS OF THERMAL OXIDIZERS

(71) Applicant: Dürr Systems Inc., Plymouth, MI (US)

(72) Inventor: Daniel Widhalm, Northville, MI (US)

(73) Assignee: DÜRR SYSTEMS INC., Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/597,777

(22) Filed: May 17, 2017

(65) Prior Publication Data
US 2017/0248054 A1 Aug. 31, 2017

Related U.S. Application Data

(63) Continuation of application No. 14/015,544, filed on Aug. 30, 2013, now Pat. No. 9,683,474.

(51) Int. Cl.
*F01N 3/28* (2006.01)
*F28D 17/02* (2006.01)
(Continued)

(52) U.S. Cl.
CPC .......... *F01N 3/2803* (2013.01); *F23G 7/068* (2013.01); *F23G 7/07* (2013.01); *F23L 15/02* (2013.01);
(Continued)

(58) Field of Classification Search
CPC ..... F01N 3/2803; F23J 2219/10; F23G 7/068; F23G 7/07; F23L 15/02; F28D 17/02; F28D 17/04
See application file for complete search history.

(56) References Cited

U.S. PATENT DOCUMENTS

| 610,292 A | 8/1898 | Thornton |
| 1,452,742 A | 4/1923 | Johnston |

(Continued)

FOREIGN PATENT DOCUMENTS

| CN | 201093906 | 7/2008 |
| EP | 0140601 | 1/1988 |

(Continued)

OTHER PUBLICATIONS

International Searching Authority, "International Search Report", issued in connection with PCT Application No. PCT/US2014/053204, dated Nov. 11, 2014, 5 pages.
(Continued)

*Primary Examiner* — Shogo Sasaki
(74) *Attorney, Agent, or Firm* — Hanley, Flight and Zimmerman, LLC

(57) ABSTRACT

Apparatus and methods are disclosed to improved block channel geometries and arrangements of thermal oxidizers. One described example apparatus includes a block of a converter having a plurality of channels defining interior walls, which define a cellular pattern in a cross-sectional view of the block. The pattern comprises regular subpatterns consisting of at least one central channel, which is proximate an interior of the block, and a plurality of surrounding channels.

13 Claims, 16 Drawing Sheets

(51) Int. Cl.
*F28D 17/04* (2006.01)
*F23L 15/02* (2006.01)
*F23G 7/06* (2006.01)
*F23G 7/07* (2006.01)

(52) U.S. Cl.
CPC .............. *F28D 17/02* (2013.01); *F28D 17/04* (2013.01); *F23J 2219/10* (2013.01); *Y02E 20/348* (2013.01)

(56) References Cited

U.S. PATENT DOCUMENTS

| | | | |
|---|---|---|---|
| 1,670,127 A | 5/1928 | Stancliffe | |
| 1,795,055 A | 3/1931 | Taylor et al. | |
| 2,018,223 A | 10/1935 | Otto | |
| 2,018,224 A | 10/1935 | Otto | |
| 2,432,198 A | 12/1947 | Karlsson et al. | |
| 2,495,960 A | 1/1950 | George | |
| 2,506,244 A | 5/1950 | Stopka | |
| 2,507,862 A | 5/1950 | Mead | |
| 2,706,109 A | 4/1955 | Odman | |
| 2,823,027 A | 2/1958 | Coberly | |
| 2,983,486 A | 5/1961 | Rosenberg | |
| 3,097,930 A | 7/1963 | Holland | |
| 3,251,403 A | 5/1966 | Smith | |
| 3,384,359 A | 5/1968 | Potocnik | |
| 3,554,273 A | 1/1971 | Kritzler | |
| 3,870,474 A | 3/1975 | Houston | |
| 4,020,896 A | 5/1977 | Mold et al. | |
| 4,321,961 A | 3/1982 | Hemsath | |
| 4,343,354 A | 8/1982 | Weber | |
| 4,361,182 A | 11/1982 | Michalak | |
| 4,378,045 A | 3/1983 | Balke et al. | |
| 4,405,010 A | 9/1983 | Schwartz | |
| 4,509,584 A | 4/1985 | Michalak et al. | |
| 4,577,678 A | 3/1986 | Frauenfeld et al. | |
| 4,651,811 A | 3/1987 | Frauenfeld et al. | |
| 4,655,802 A | 4/1987 | Jaumann | |
| 4,789,585 A | 12/1988 | Saito et al. | |
| 5,352,115 A | 10/1994 | Klobucar | |
| 5,516,571 A | 5/1996 | Kawamoto | |
| 5,590,708 A | 1/1997 | Ulrich | |
| 5,755,569 A | 5/1998 | Berg et al. | |
| 5,851,636 A | 12/1998 | Lang et al. | |
| 5,893,406 A | 4/1999 | Brophy | |
| 6,019,160 A | 2/2000 | Chen | |
| 6,062,297 A | 5/2000 | Kasai et al. | |
| 6,264,464 B1 | 7/2001 | Bria | |
| 6,793,010 B1 | 9/2004 | Manole | |
| 7,354,879 B2 | 4/2008 | Reid | |
| 8,361,592 B2 | 1/2013 | Miyairi et al. | |
| 9,683,474 B2 | 6/2017 | Widhalm | |
| 2004/0170804 A1 | 9/2004 | Niknafs et al. | |
| 2006/0217262 A1 | 9/2006 | Yoshida | |
| 2009/0176053 A1* | 7/2009 | Miyairi .............. | B01D 46/0001 428/116 |
| 2010/0155038 A1 | 6/2010 | Greco et al. | |
| 2011/0042035 A1 | 2/2011 | Seebald | |
| 2011/0127011 A1 | 6/2011 | Agostini et al. | |
| 2011/0240622 A1 | 10/2011 | Sanchez et al. | |
| 2012/0048524 A1 | 3/2012 | Murayama et al. | |
| 2015/0066176 A1 | 3/2015 | Widhalm | |

FOREIGN PATENT DOCUMENTS

| | | |
|---|---|---|
| EP | 1136755 | 9/2001 |
| GB | 690515 | 4/1953 |
| JP | 2000-258081 | 9/2000 |
| JP | 2000258081 | 9/2000 |

OTHER PUBLICATIONS

International Searching Authority, "Written Opinion", issued in connection with PCT Application No. PCT/US2014/053204, dated Nov. 11, 2014, 7 pages.

International Searching Authority, "International Preliminary Report on Patentability", issued in connection with PCT Application No. PCT/US2014/053204, dated Mar. 1, 2016, 7 pages.

The State Intellectual Property Office of China, English version of "First Office Action", issued in connection with Chinese Patent Application No. 201480008079.0, dated Jul. 25, 2016, 12 pages.

The State Intellectual Property Office of China, English version of "Second Office Action", issued in connection with Chinese Patent Application No. 201480008079.0, dated Feb. 4, 2017, 19 pages.

Gu et al., On the design of two-dimensional cellular metals for combined heat dissipation and structural load capacity, International Journal of Heat and Mass Transfer 44, Jun. 2001, 13 pages.

Suh et al., Modeling particle formation during low-pressure silane oxidation: Detailed chemical kinetics and aerosol dynamics, J. Vac. Sci. Technol. A. vol. 19, No. 9, May 2001, 12 pages.

United States Patent and Trademark Office, "Notice of Allowance," issued in connection with U.S. Appl. No. 14/015,544, dated Feb. 14, 2017, 24 pages.

United States Patent and Trademark Office, "Non-Final Office Action," issued in connection with U.S. Appl. No. 14/015,544, dated Aug. 11, 2016, 27 pages.

United States Patent and Trademark Office, "Election/Restriction," issued in connection with U.S. Appl. No. 14/015,544, dated Mar. 18, 2016, 10 pages.

English translation of Chinese Patent Office, "Notice of Decision of Granting Patent Right for Invention," issued in connection with Chinese application No. 201480008079.0, dated Jul. 31, 2018, 3 pages.

English Translation of the State Intellectual Property Office of China, "Third Office Action," issued in connection with Chinese application No. 201480008079.0, dated Aug. 7, 2017, 5 pages.

English version of the State Intellectual Property Office of China, "Fourth Office Action," issued in connection with Chinese application No. 201480008079.0, dated Jan. 25, 2018, 22 pages.

* cited by examiner

| Cell Structure | Inner Wall Thickness [mm] | Outer Wall Thickness [mm] | Number of Cells |
|---|---|---|---|
| Square | 0.5 | 1.5 | 1849 |
| Hexagonal | 0.5 | 1.5 | 2134 |
| Circular | 0.5 | 1.5 | 2134 |

FIG. 21

| Cell Structure | Flow Area [mm2] | Dead Area [mm2] | Dead Area [mm2] |
|---|---|---|---|
| Square | 12,213 | 15,550 | 15,550 |
| Hexagonal | 14,095 | 15,543 | 12,434 |
| Circular | 14,095 | 14,095 | 11,276 |

| Dh/t | Thermal Efficency (%) | Plug resistance (months) | Weight of block (kg) |
|---|---|---|---|
| 1 | 1 | 6.3 | 10 |
| 1.2 | 1.2 | 5.8 | 8 |
| 1.4 | 1.5 | 5.5 | 7 |
| 2 | 2.6 | 5.2 | 6 |
| 5 | 2 | 5 | 5 |

FIG. 26

BLOCK CHANNEL GEOMETRIES AND ARRANGEMENTS OF THERMAL OXIDIZERS

RELATED APPLICATION

This patent arises as a continuation of U.S. patent application Ser. No. 14/015,544, which was filed on Aug. 30, 2013, and granted as U.S. Pat. No. 9,683,474, and is hereby incorporated herein by reference in its entirety.

FIELD OF THE DISCLOSURE

This disclosure relates generally to converters, including thermal oxidizers, and, more particularly, to block channel geometries and arrangements.

BACKGROUND

Thermal oxidizers have blocks (e.g., refractory elements) with a refractory material to exchange heat between the blocks and a gaseous or liquid flow. Typically, thermal efficiency and plug resistance are issues with the blocks.

BRIEF DESCRIPTION OF THE DRAWINGS

FIG. 21 is a table representing the production capable design parameters found within another example block with a width of 150 mm.

FIG. 22 is a table representing resultant block data for system performance of the example block of FIG. 21.

FIG. 26 illustrates a table representative of output data shown on an output device of the example processor platform of FIG. 25 executing the example processes of FIGS. 23 and/or 24.

To clarify multiple layers and regions, the thickness of the layers are enlarged in the drawings. Wherever possible, the same reference numbers will be used throughout the drawing(s) and accompanying written description to refer to the same or like parts.

DETAILED DESCRIPTION

Figure 1:
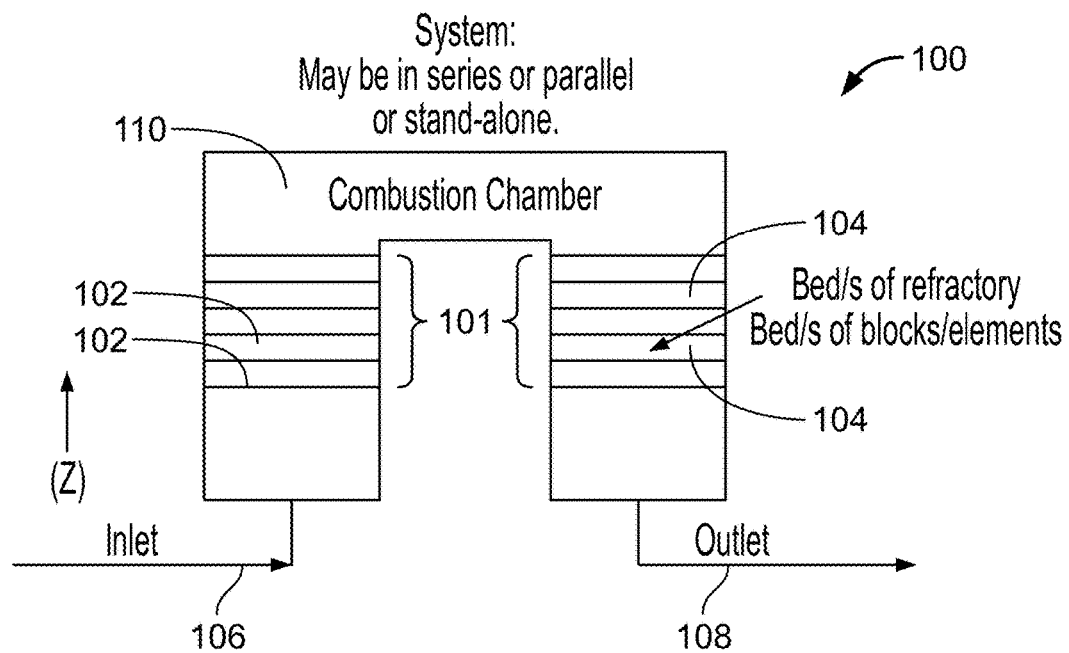
FIG. 1 shows an example oxidation system having a set of towers.

Apparatus and methods to improve plug resistance and/or thermal efficiency for blocks of thermal oxidizers are described herein. Although thermal oxidizers are described, the described methods and apparatus may apply to other converter blocks including selective catalytic reducers ("SCRs"), etc. One described example apparatus includes a block of a converter having a plurality of channels defining interior walls, which define a cellular pattern in a cross-sectional view of the block. The pattern comprises regular sub-patterns consisting of at least one central channel, which is proximate an interior of the block, and a plurality of surrounding channels.

Another example apparatus includes a block of a converter having a plurality of channels defining interior walls, which define a cellular pattern in a cross-sectional view of said block. The pattern comprises regular sub-patterns consisting of at least one central channel on an interior of the block and a plurality of surrounding channels proximate an interior of the block. Each central channel is surrounded by five or more of the surrounding channels, and the interior walls have a varying thickness along a perimeter of each central channel.

Another example apparatus includes a block of a converter and a plurality of channels defining interior walls and extending through a depth of the block to allow fluid to flow therethrough. Each of the central channels, which is proximate an interior of the block, is surrounded by five to twelve surrounding channels and each central channel has a profile with a shape having greater than four sides. Each surrounding channel is substantially equidistant to a center of its respective central channel.

Another described example apparatus includes a block of a converter and a plurality of channels extending through the block to allow fluid to flow therethrough. Each channel is in fluid communication with an opening of a heating chamber and each central channel in an interior of the block is surrounded by five to twelve surrounding channels. Each surrounding channel is substantially equidistant to a center of its respective central channel and each channel exchanges heat between the fluid and the block.

Another described apparatus includes a plurality of channels extending through a block of a converter to allow a fluid to flow therethrough. Each central channel in an interior of the block has a shape having greater than four sides and is surrounded by five or more surrounding channels. Each surrounding channel being substantially equidistant to a center of its respective central channel and a ratio of a hydraulic diameter of the central channels over interior wall thicknesses between the channels is to be approximately equal to a value in a range from 0.58 to 6.53.

One described method includes determining relevant equations to increase plug resistance of channels in a converter, calculating, using a processor, particle formations utilizing theoretical particle formations, calculating a time to plug using a general form for the time of coalescence, calculating a kappa factor reiteratively, calculating secondary factors to determine plug resistance results of the channels, and outputting the plug resistance results and secondary results.

Another described example method includes determining relevant equations to increase thermal efficiency of channels in a converter, calculating transient effects of the system using a transient thermal convective equation, calculating, using a processor, a convectional coefficient using channel morphology factors, calculating wetted and occupied areas for the channels, calculating a secondary parameter to determine thermal efficiency results of the channels, and outputting the thermal efficiency results and secondary results.

Some of the examples described relate to blocks containing refractory materials or other similar materials found within thermal oxidizing systems. Refractory material retains its shape and structure at high temperatures and may comprise ceramics, clay materials, silica, zirconia, alumina, and/or oxides such as lime and magnesia. The main classifications of refractory material may include clay-based, alumina-based, magnesia, dolomite, carbonates, silica, zircon, etc. Precious metals and iron-based refractory materials also exist.

A thermal oxidation block exchanges heat between the block and a gaseous or liquid flow of a stream passing through the block. The stream is heated in a chamber, in which the fluid is chemically converted in an exothermic reaction (e.g., exothermally oxidizes). The examples disclosed relate to cross-sectional designs of the blocks (e.g., refractory elements). The examples disclosed also describe calculating the dimensional characteristics for channels (e.g., cells, passages), or any other relevant critical features. Parameters for defining the gaseous or liquid flow through the block may include a channel hydraulic diameter, an inner wall width and an outer wall width. These parameters are related to fluid properties of the flow and thermal characteristics of the system and also affect the eventual plugging of the block. The hydraulic diameter relates the cross-sectional area to its respective perimeter and is commonly used for calculating a Reynolds number for pipe flow. Plugging may occur as the gas or liquid containing impurities imparts particles onto the channels, which may adhere to surface walls of the channels, and, eventually, these particles may plug (e.g., clog) the channels. Plugging may be reduced by use of an anti-adhesive coating (e.g., a silicon resistance coating) or a catalytic coating. The catalytic coating, which contains a catalyst, may be applied in an SCR process to further neutralize the harmful compounds present.

Thermal oxidizer blocks generally use blocks with square channel designs. The edges of the square channels are usually aligned (i.e., sets of rows are not offset from one another). The equations and ratios described below are related to an improved channel (e.g., cell) design in comparison to known hydraulic diameter and square channel designs. The system performance improvements seen by the examples described may be one or more of a combination of efficiency, streamlining or resistance to plugging (e.g., clogging), thermal convection, flow stagnation, pressure differential and destruction removal efficiency ("DRE"). The DRE is a measure of destruction of harmful gases (e.g., volatile organic compounds ("VOCs")). Destruction of the VOCs occurs when the VOCs oxidize (e.g., become other compounds) as they are heated. The DRE is calculated by dividing the mass or volume of the VOCs exiting by the mass or volume of the VOCs that enters the oxidizer (e.g., 10 lbs. of VOCs enters while 1 lb. of the VOCs exits results in a corresponding 90% DRE). Critical features of the block may be limited by current production technology, which may include extruding and stamping (e.g., the limitations may include arrangement of the channels, size of the channels, amount of the channels in a defined area, etc.).

The examples described herein improve the system efficiency and/or resistance to plugging (e.g., increase the time until the blocks become clogged or plugged) in conjunction with at least one other system performance factor. One described example block employs a heat transfer regenerative mass and has a plurality of channels for the exchange of heat between the fluid and the block. Geometry of the block channels is designed to increase efficiency and/or resistance to plugging, and manufactured to provide a cross-sectional structure to improve the system performance factors. The interior channel wall thicknesses of the blocks may be defined by multiple factors to enhance the performance of the blocks within known manufacturing limitations. Additionally, the geometry of a boundary of the block itself (e.g., outer wall) may be adjusted to be further improve overall performance of the block.

The design of the geometry of the channels and the spacing between the channels may have significant effects on the overall performance of the block and, therefore, the thermal oxidizer. Additionally, the shape of the channels (e.g., round, hexagonal, octagonal, square, parallelogram, ellipse, oval, etc.) may also significantly affect thermal efficiency, plug resistance and numerous other measures of performance. Utilizing a round profile channel surrounded by at least six other surrounding channels may significantly improve thermal efficiency over other channel arrangements.

Likewise, utilizing a hexagonal or octagonal profile surrounded by six other surrounding channels may significantly improve resistance to plugging. Time to plugging is a variable that is necessary to be accounted for, in conjunction with thermal efficiency. Particle growth models provide an ability to account for particle coalescence and, thus, plugging. The examples described in accordance with the teachings of this disclosure describe channel geometries and arrangements that substantially improve thermal efficiency and/or plug resistance.

Although certain geometries of the channels are described, the geometry of the channels may vary and include shapes such as a shape having greater than four sides which may contain sharp and/or rounded edges. Other channel geometries may include shapes which may contain intersecting tangent angles that are always less than 90 degrees, shapes consisting of straight or spline segments, shapes containing polygons with a combination of splines, and/or any other appropriate shapes to allow fluid to flow through the channels.

Some oxidizer systems may involve switching or reversing between stacks (e.g., towers) of blocks in fluid communication with a combustion chamber. In scenarios in which it is desirable to keep the fluid or gas at relatively elevated temperatures as the fluid or gas is provided to the combustion chamber, the blocks themselves may heat the fluid or gas on a second cycle after the directions are reversed (e.g., the outlet on the previous cycle becomes an inlet the next cycle). In some examples, the blocks may have sharp (e.g., "knife-like") edges proximate an inlet and/or outlet of the blocks to further improve plug resistance of the blocks.

FIG. 1 shows an example oxidation system 100 having a set of towers. The system 100 may also be represented as a rotating or circular system, or any other structure or appropriate combination of structure types. In any case, beds 101 are comprised of a set of blocks 102 and blocks 104, which may be substantially identical or different. The blocks 102 are adjacent to an inlet 106 and the blocks 104 are adjacent to an outlet 108. The blocks 102, 104 utilize a unidirectional heat transfer path (e.g., the fluid is heated and cooled in the blocks 102, 104 without the use of another flow) and may have a refractory material and comprise a ceramic material, brick, metal, precious metal, silica/s, clay, carbides, graphites or be made of any appropriate material stable at high temperatures. Different types of blocks 102, 104 may be used in the oxidation system 100. Additionally, the blocks 102, 104 may be produced from stamping, extruding, molding or any other appropriate manufacturing process. In contrast to the blocks 102, 104, heat exchangers utilize bi-directional flows (e.g., two or more fluids crossing paths in a countercurrent arrangement).

In operation, fluid flows from the inlet 106 and into the blocks 102. As the fluid moves through the blocks 102, heat is transferred from the blocks 102 to the fluid. After the fluid passes through the blocks 102, the fluid flows into a combustion chamber 110, where the fluid is heated. Although the combustion chamber 110 is shown, any appropriate type of heating chamber may be used. Heating the fluid oxidizes the fluid and allows some impurities (e.g., VOCs) to be taken out (e.g., burned-off). After being heated, the fluid then moves into the blocks 104. As the fluid moves through the blocks 104, heat is transferred from the fluid to the blocks 104. Finally, the fluid flows out of the oxidation system 100 through the outlet 108.

Figure 2:
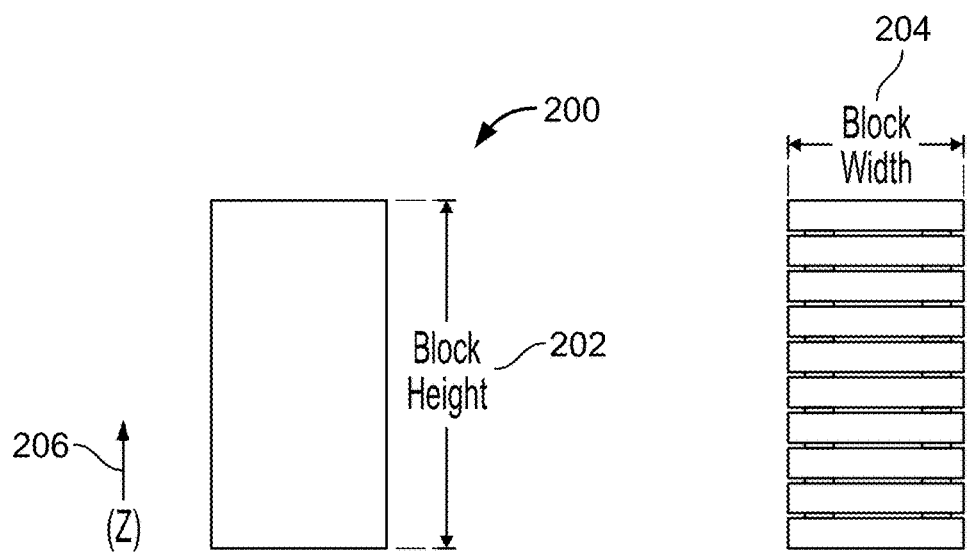
FIG. 2 is a view of a standard block profile of an example block.

FIG. 2 is a view of a standard block profile of a block 200, which is used here to represent numerous different block profiles. A block height 202 (e.g., "Z" or "H-block") is the effective height of the block and a block width 204 (e.g., "X") is the effective width of the block and equal to a depth (e.g., "Y", which is not shown). In scenarios in which cuts or openings are present in the block 200, or if the block 200 has an irregular shape, an altered mass center of gravity will have to be taken into account with respect to the flow parameters. The main flow direction (e.g., "Z") is indicated by an arrow 206.

Figure 3:
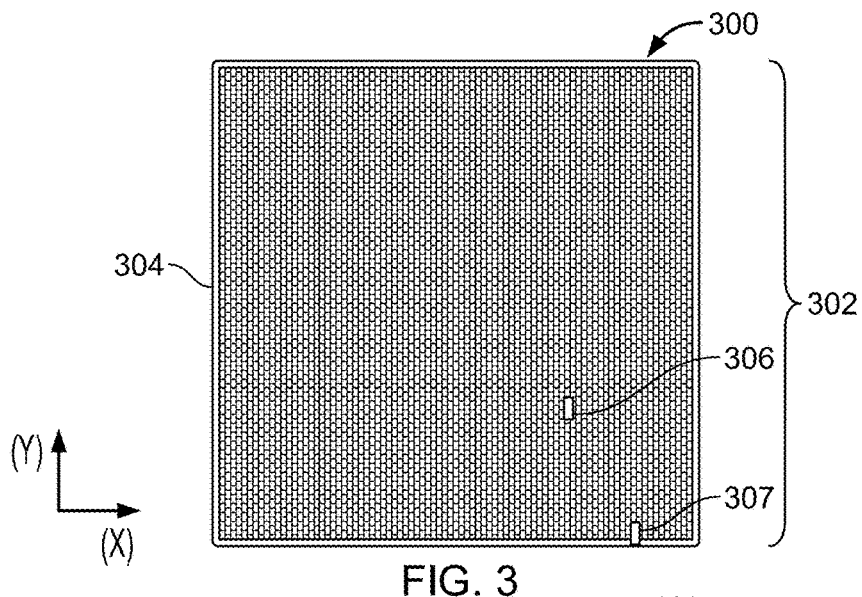
FIG. 3 is a view of another example block viewed in a direction along axes of channels.

FIG. 3 is a view of a block 300 viewed in a direction along axes of channels 302. A block may vary due to manufacturing feasibility and/or system requirements defined by a customer and/or a responsible party, and vary based upon factors including required thermal efficiency, time to plugging, manufacturability, cost, space-constraints, etc. The block 300 has a width consistent with X and Y described above in connection with FIG. 2. The block 300 may also have a surrounding wall 304, which encloses the channels 302, and may have a thickness greater than or equal to inner wall thicknesses defined by the channels 302. While the block 300 is depicted as having a square shape, it may have any appropriate shape including, but not limited to, round, oval, hexagon, octagon, wedged, rectangular, parallelogram, etc. The block 300 may also have slits 306 and/or grooves 307 on an exterior or interior of the block 300 to fluidly couple a portion of the channels 302. The slits 306 may have a minimum width of approximately 0.25 mm and minimum depth of 0.1 mm. Recommended dimensions for the slits 306 are approximately less than 0.5 mm in width and less than 50 mm in length to properly allow fluid communication between the channels 302, or any other appropriate size. The width of the slits 306 and/or the grooves 307 may be approximately greater than or equal to one-third of the inner wall thickness to allow proper fluid flow between the slits 306. These dimensions are the result of tooling and fluid dynamic analysis. In examples where the hydraulic diameter is on the order of the inner wall thickness, relatively high pressures may drive the flow through a normal path, however, if the flow through the normal path is choked, then the flow may travel through the slits 306 and between the channels 302. Additionally or alternatively, a silicon-resistant coating (e.g., paraffin, etc.) may be applied to the channels 302 in order to further resist plugging.

Figure 4:
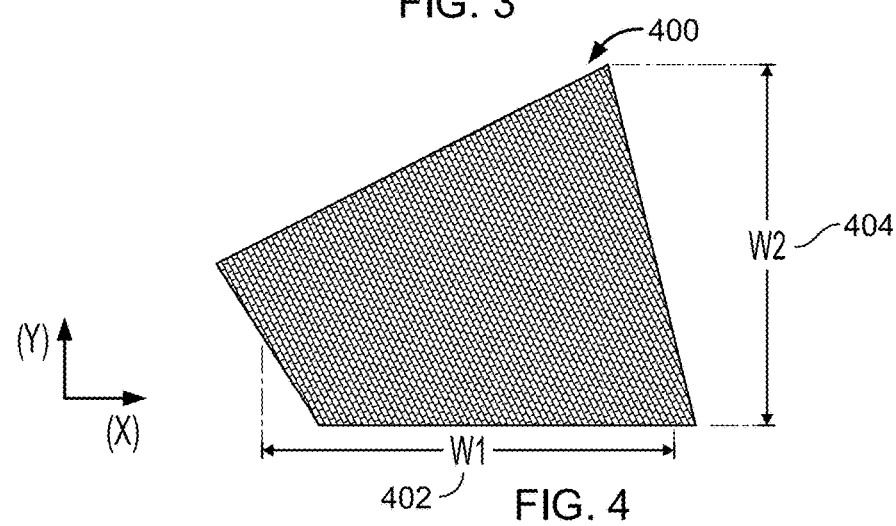
FIG. 4 is a view of another example block having different effective widths.

FIG. 4 is a view of a block 400 with a consistent mass and flow distribution in Z (direction into the page) while being offset in a direction 402 and a direction 404. These offsets correspond to the block 400 having differing effective widths in the directions 402, 404. Note that block variations may exist at any point within the mass of refractory channels and may be of any shape comprising splines, lines and/or curves. Geometric variations and irregularities of block shapes may be accounted for with the examples described below.

Figure 5:
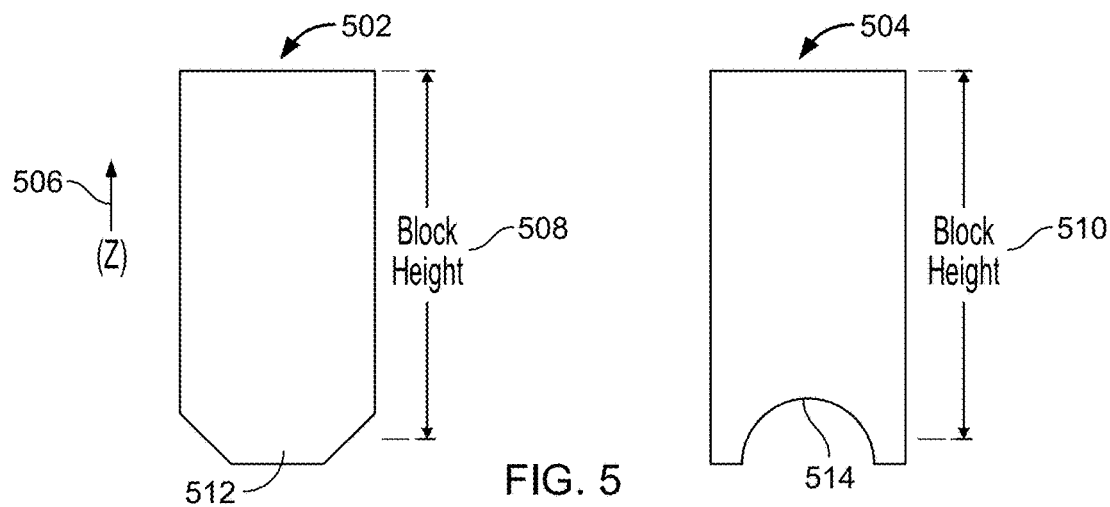
FIG. 5 depicts example irregular-shaped blocks and illustrates effective block heights.

FIG. 5 depicts irregular-shaped blocks 502 and 504, and illustrates effective block heights. An arrow 506 indicates a direction of fluid flow. Effective block heights 508, 510 for the blocks 502, 504, respectively, illustrate how irregularities such as a rounded contour 512 and a notch 514 may be accounted for. As mentioned above in connection with FIG. 4, block variations may exist at any point within the mass of refractory and may be of any shape representable by any combination of splines, lines and/or curves.

Figure 6:
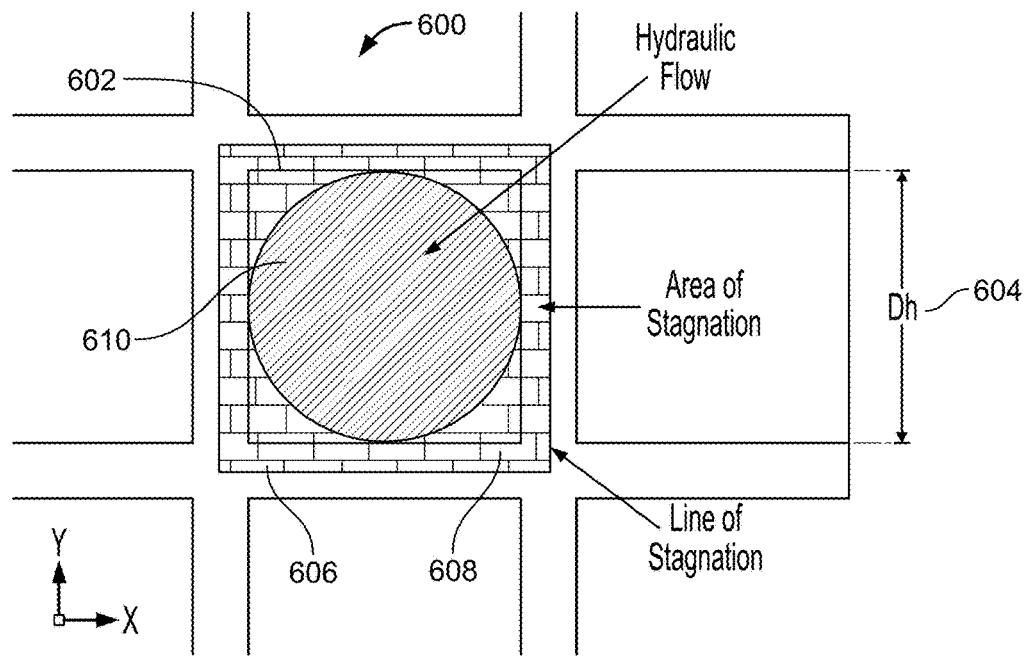
FIG. 6 is an enlarged cross-sectional view of another example block having a four-sided polygon channel shape.

FIG. 6 is an enlarged cross-sectional view of a block 600 containing a channel 602 representative of a four-sided polygon, which is used as a baseline for comparisons. The flow direction is normal to the page. A dimension 604 indicates a hydraulic diameter (e.g., "$D_h$"). A line of stagnation 606 delineates adjoining channels or other features which cause stagnation point(s) in the flow, and is a function of the geometry of the channel 602. An area of stagnation 608 is the zone between the line of stagnation 606 and a hydraulic flow 610, which indicates the main flow area, and is not affected by the boundaries of where the fluid is in contact with surfaces of the channel 602.

Figure 7:
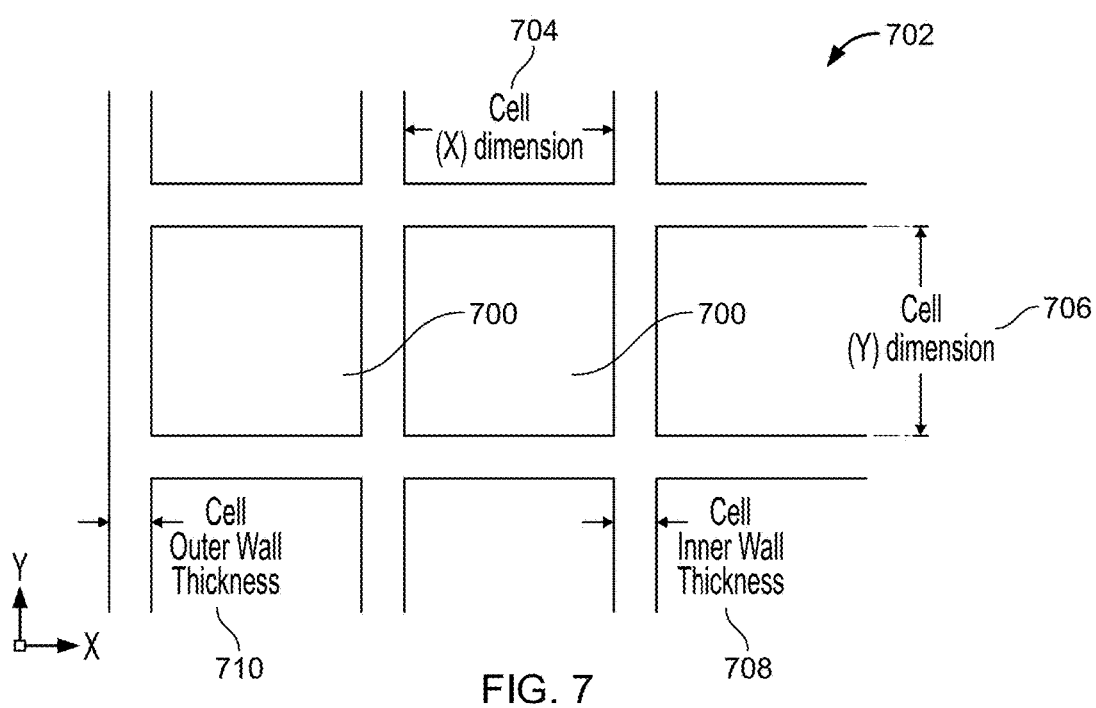
FIG. 7 is an enlarged cross-sectional view of four-sided channels in another example block.

FIG. 7 is an enlarged cross-sectional view of four-sided polygon channels 700 in a block 702, which are commonly referred to as square channels, and have a substantially square shape (i.e., a dimension 704 represented by "X" is substantially equal to a dimension 706 represented by "Y"). A dimension 708 indicates the thickness of the inner walls defined by the channels 700 and a dimension 710 indicates the thickness of the outer walls of the block 702.

Figure 8:
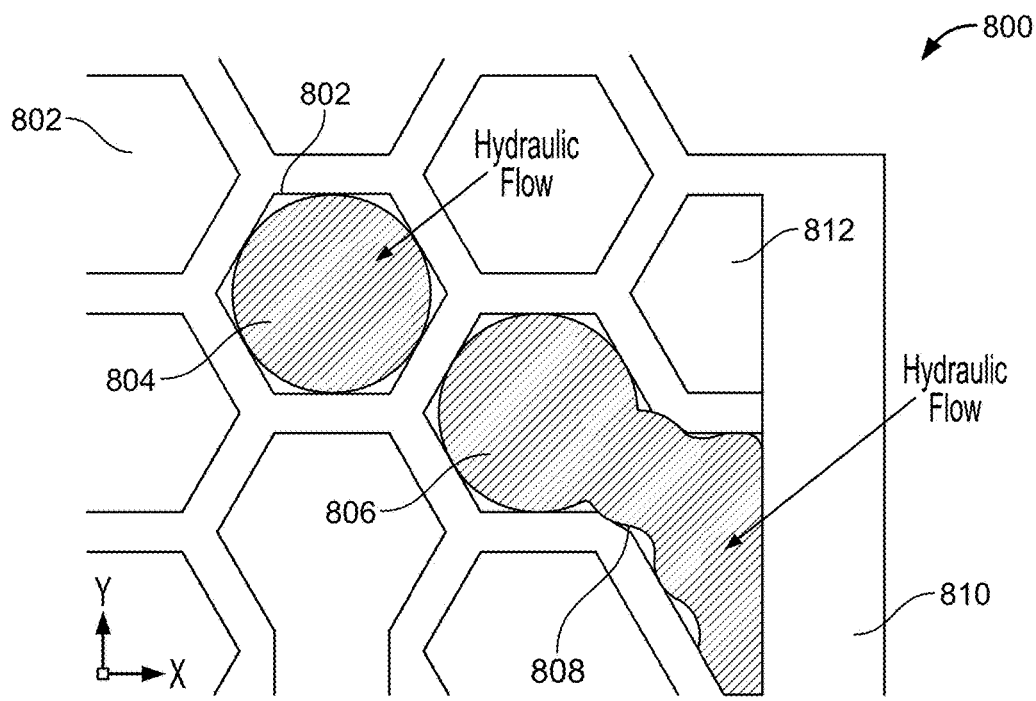
FIG. 8 is an enlarged cross-sectional view of another example block containing hexagonal channels.

FIG. 8 is an enlarged cross-sectional view of a block 800 containing hexagonal channels 802. A hydraulic flow 804 is representative of a relatively low mean velocity passing through the channel 802. A relatively low mean velocity is that which is comparable to $$300 \frac{SCFM}{ft^2} \text{ or } 5100 \frac{N\ m3}{hr\ m^2}.$$

$D_h$, the hydraulic diameter relating the possible flow to its perimeter, which is found through equation 4, is described below in connection with FIG. 23. This calculation is applicable to channel velocities between $$0.1 \frac{m}{s} \text{ and } 100 \frac{m}{s}.$$

A hydraulic flow 806 is shown in an irregular channel 808. The irregular channel 808 may result from edge effects near an outer edge 810. These edge effects/irregularities may result from the manufacturing processes (e.g., extruding or stamping, etc.) or an intended design to maintain a constant wall thickness in the outer edge 810 (i.e., as shown in another irregular channel 812).

Figure 9:
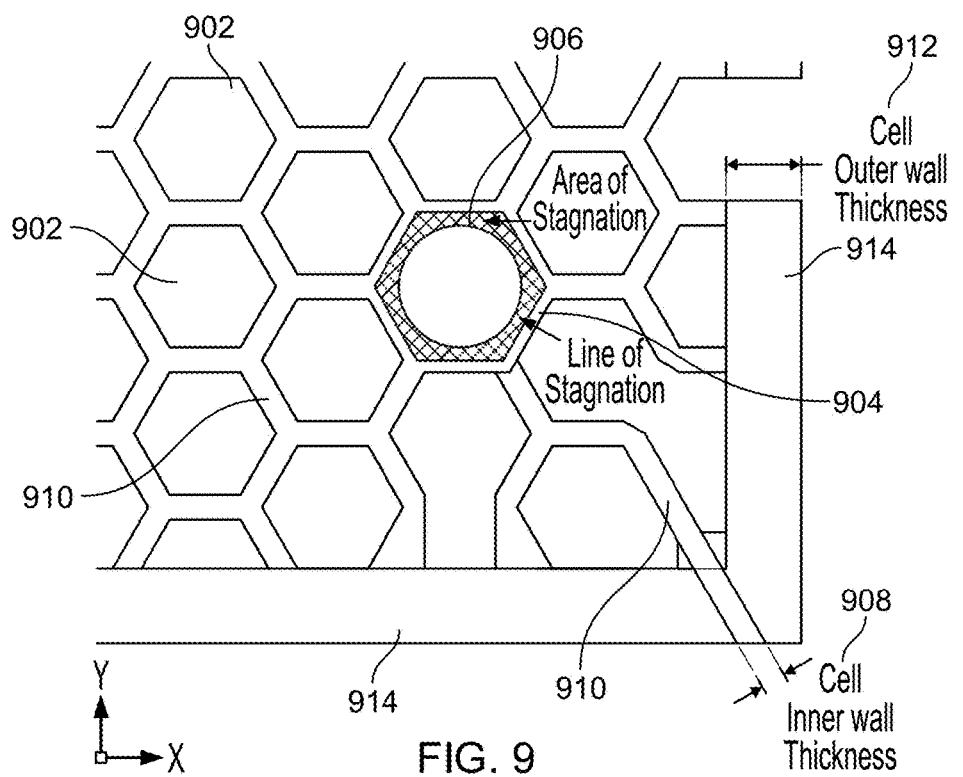
FIG. 9 is an enlarged cross-sectional view of another example block containing hexagonal channels.

FIG. 9 is an enlarged cross-sectional view of a block 900 with hexagonal channels 902. A line of stagnation 904 delineates the mean value between two or more zones of flow. An area of stagnation 906 is determined by subtracting the live or hydraulic flow zone away from the total occupied area of the channel 902. For calculations, which will be described below in greater detail in connection with FIGS. 23 and 24, a channel inner wall thickness 908 is the mean value of all the thicknesses of inner walls 910, weighted appropriately with respect to the channel flow. Similarly, an outer wall thickness 912 is the mean value of all of outer walls 914 weighted appropriately with respect to the block-edge flow. The parameters pictorially shown in connection with FIGS. 8 and 9 are applicable to the calculations described in connection with FIGS. 23 and 24.

Figure 10A:
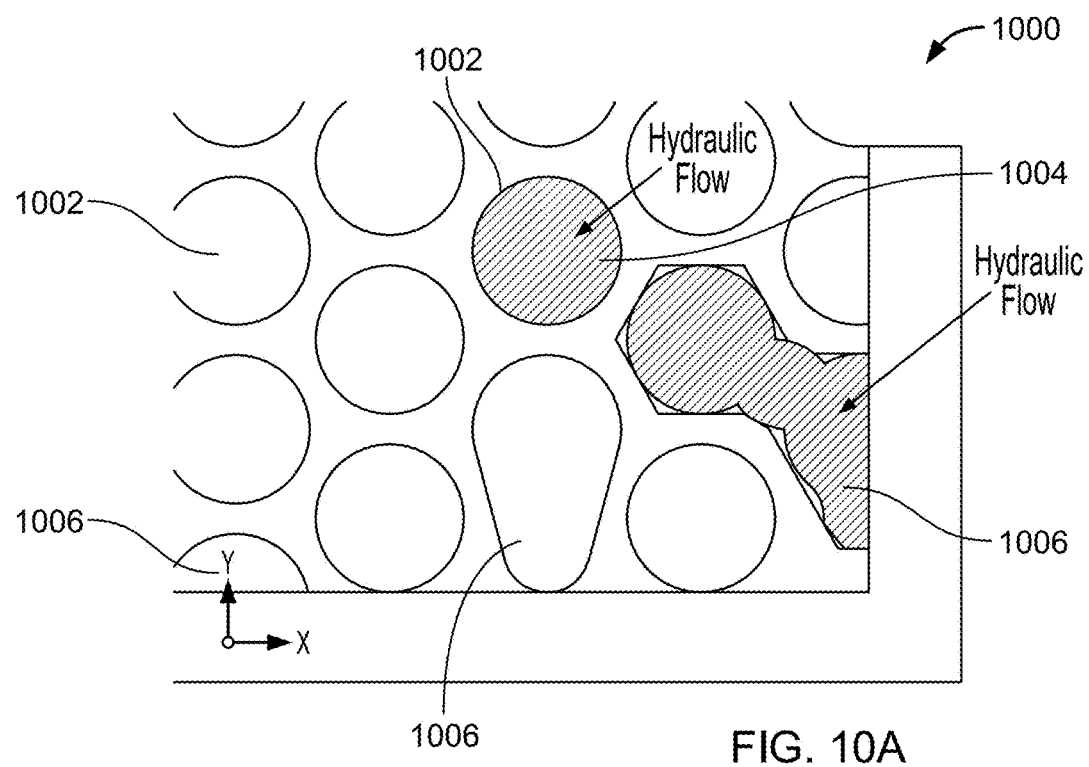
FIG. 10A is an enlarged cross-sectional view of another example block with round channels.

FIG. 10A is an enlarged cross-sectional view of a block 1000 with round channels 1002. A hydraulic flow area 1004 of the round channels 1002, by definition, is equivalent to the area of each of the round channels 1002. The round channels 1002 may be surrounded by irregular channels 1006 because of the edge effects described above in connection with FIG. 8.

Figure 10B:
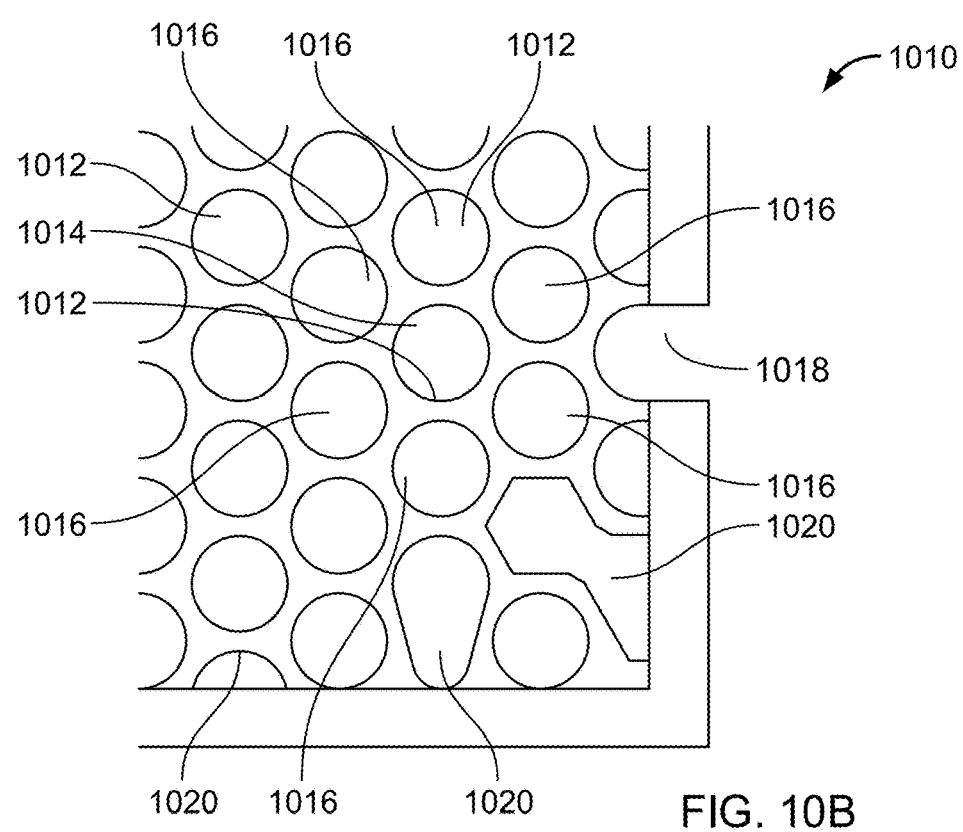
FIG. 10B is an enlarged cross-sectional view of another example block with round channels in accordance with the teachings of this disclosure.

FIG. 10B is an enlarged cross-sectional view of a block 1010 with round channels 1012 in accordance with the teachings of this disclosure. A central round channel 1014 is surrounded by six surrounding channels 1016 in a cellular pattern. The surrounding blocks 1016 may be substantially equidistant to the center channel 1014. Although the surrounding blocks 1016 are shown in a substantially equiangular arrangement, they may be not necessarily be arranged in the equiangular arrangement. Surrounding the central channel 1014 by six other channels 1016 may result in the largest thermal efficiency, as described in further detail below in connection with FIG. 24. The block 1010 may also include a notch 1018 on the exterior or interior of the block 1010 and/or irregular channels 1020 near a periphery of the block 1010. The pattern of arrangement of the channels 1012 may include sub-patterns of the central channels 1014 surrounded by surrounding channels 1016. Each of the central channels 1014 may have a varying (e.g., substantially non-constant) inner wall thickness around a perimeter of the central channel 1014.

Figure 11:
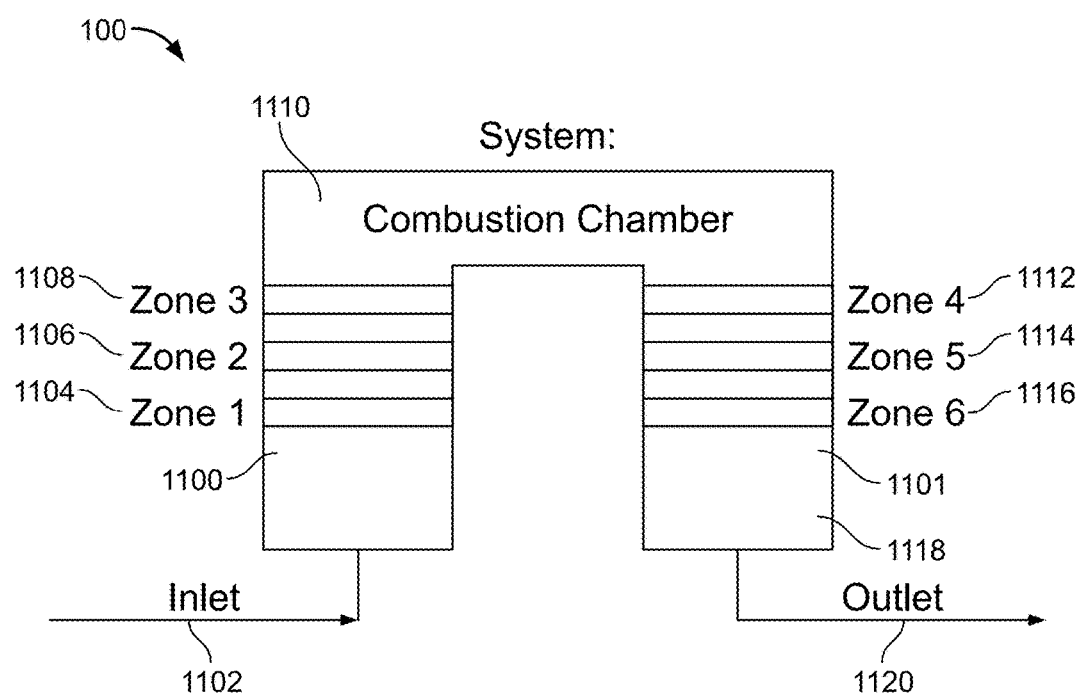
FIG. 11 is a view of the oxidation system of FIG. 1 depicting the representative zone definitions of the system.

FIG. 11 is another view of the oxidation system 100 depicting representative zone definitions of the system 100. Towers 1100 and 1101, in this example, do not alternate functions as shown in connection with FIGS. 12 and 13. An inlet zone 1102 is where the incoming waste fluid (e.g., raw waste gas or stream) enters the system 100. A portion 1104 (e.g., "Zone 1") directs the waste fluid through the face of a bed of blocks or media. A portion 1106 (e.g., "Zone 2") lies between portion 1104 and a portion 1108 (e.g., "Zone 3") and the waste fluid simply passes through the portion 1106. The portion 1108 exhausts the waste fluid into a combustion zone 1110. The combustion zone 1110 is a primary oxidation zone. A portion 1112 (e.g., "Zone 4") accepts the oxidized flow from the combustion zone 1110. A portion 1114 (e.g., "Zone 5") lies between the portion 1112 and a portion 1116 (e.g., "Zone 6"). The portion 1116 directs the oxidized fluid through an exhaust face 1118. An outlet zone 1120 directs oxidized fluid away from the system 100. The features and design of the inlet 1102 are process dependent and may depend upon system requirements. Portions 1104, 1106, 1108, 1112, 1114, 1116 are delineated by their respective temperature slopes with respect to height $$\left( \text{i.e., } \frac{\partial T}{\partial z} \right).$$

As seen by fundamental equation 16, which is described below in connection with FIG. 24, the slopes will vary in relationship to the combustion zone 1110 and the inlet zone 1102 or the outlet zone 1120. The zones described here may vary, however, the fundamental conditions which occur through portions will remain consistent with respect to the variables presented in a particular system. Additionally, the system 100 may also have valves which direct the flow between the different and portions and between the different towers.

Figure 12:
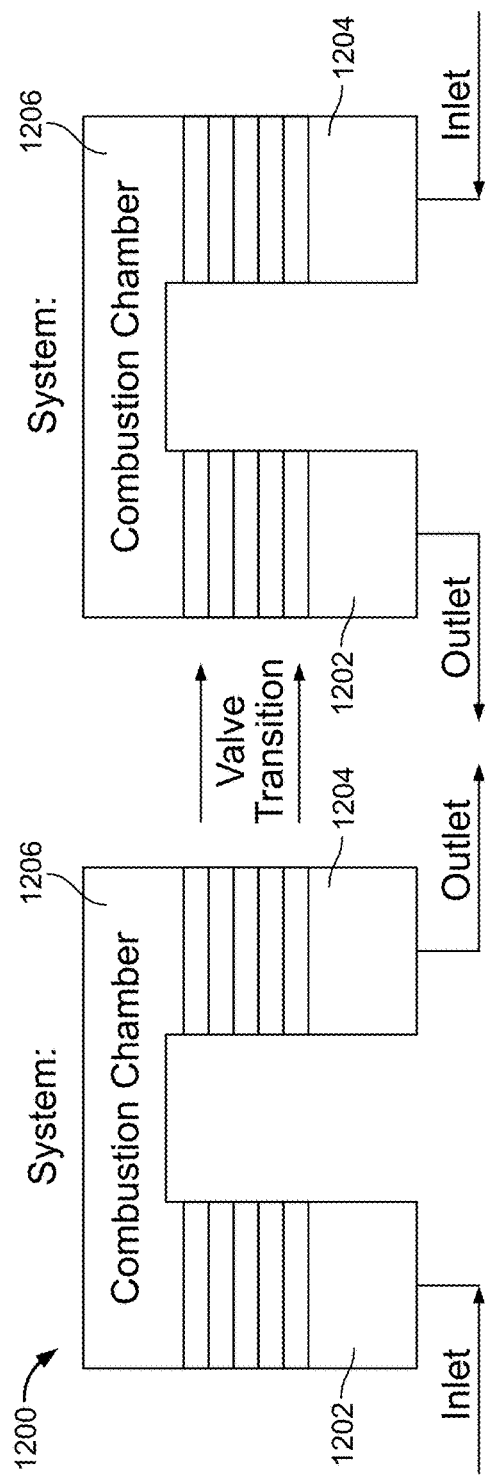
FIG. 12 is a view of another example oxidation system depicting flow switching towers.

FIG. 12 is a view of an oxidation system 1200 depicting flow switching towers 1202, 1204 cycling (e.g., alternating) between being an inlet or an outlet as a function of time. This alternating preheats fluid prior to entering combustion chamber 1206 by utilizing the heat added to the current inlet (e.g., the outlet on the previous cycle) from the heated fluid exiting the chamber 1206 on the previous cycle. This transition may occur periodically or may be dependent on certain conditions (e.g., desired DRE, temperature conditions of the environment or the oxidation system 1200, etc.) and may occur through mechanically switching valves. The valve transition may also occur through any other mechanical device or any appropriate combination of electrical and mechanical devices. During this valve transition, a spike in the DRE may occur. A "dead" volume attributed to the DRE is volume that is dormant during a transition period.

Figure 13:
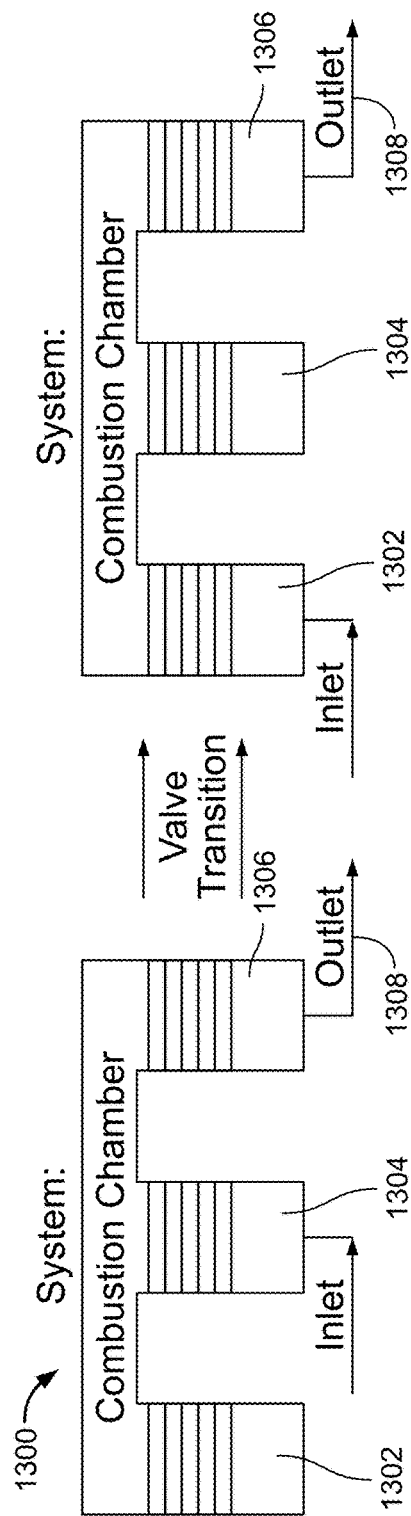
FIG. 13 is a view of another example oxidation system depicting flow switching towers with alternating inlets as a function of time.

FIG. 13 is a view of an oxidation system 1300 with switching towers 1302, 1304 alternating as inlets (e.g., transitioning). In this example, a tower 1306 remains the outlet tower. Similar to oxidation system 1200, this transition between switching towers 1302, 1304 may occur periodically or may be dependent on certain conditions (e.g., desired DRE, temperature conditions of the environment or the oxidation system 1300, etc.) and may occur through mechanically switching valves. The valve transition may also occur through any other mechanical device or any appropriate combination of electrical and mechanical devices. Similar to the oxidation system 1200, during the valve transition, a spike in the DRE may occur. The tower 1306, which is not attached to the switching towers 1302, 1304, exhausts oxidized gas to an outlet stream 1308.

Figure 14:
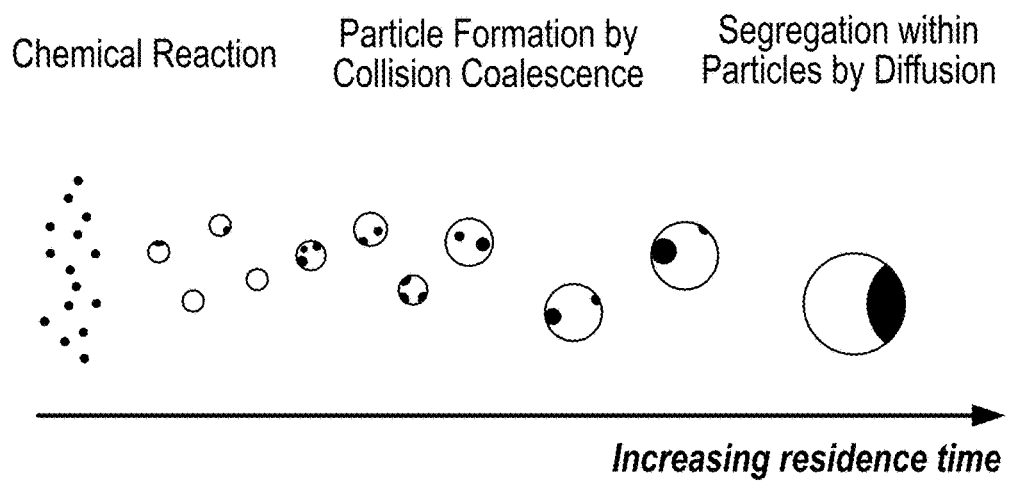
FIG. 14 is a graph depicting general particle formation with respect to time.

FIG. 14 is a graph depicting general particle formation with respect to time. As time in a residence chamber increases, the particle size increases. Through various studies and theoretical equations, it may be demonstrated that particle formations may be inhibited by lowering temperature, lowering pressure and/or decreasing the residence time.

Figure 15:
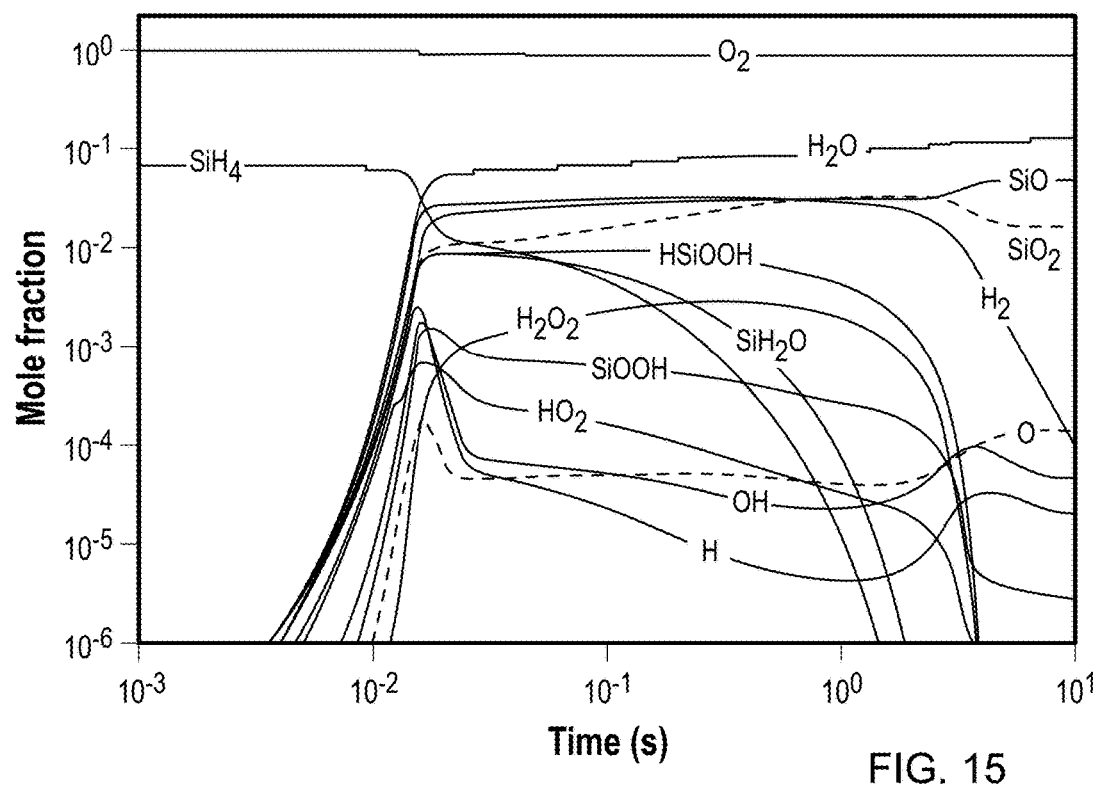
FIG. 15 is another graph depicting general particle formation with respect to time using Quantum Rice-Ramsperger-Kassel ("QRRK") Theory.

FIG. 15 is a graph depicting composition of molecules with respect to time using Quantum Rice-Ramsperger-Kassel ("QRRK") theory at a pressure of 101.3 Pa and a temperature of 500° C.

Figure 16:
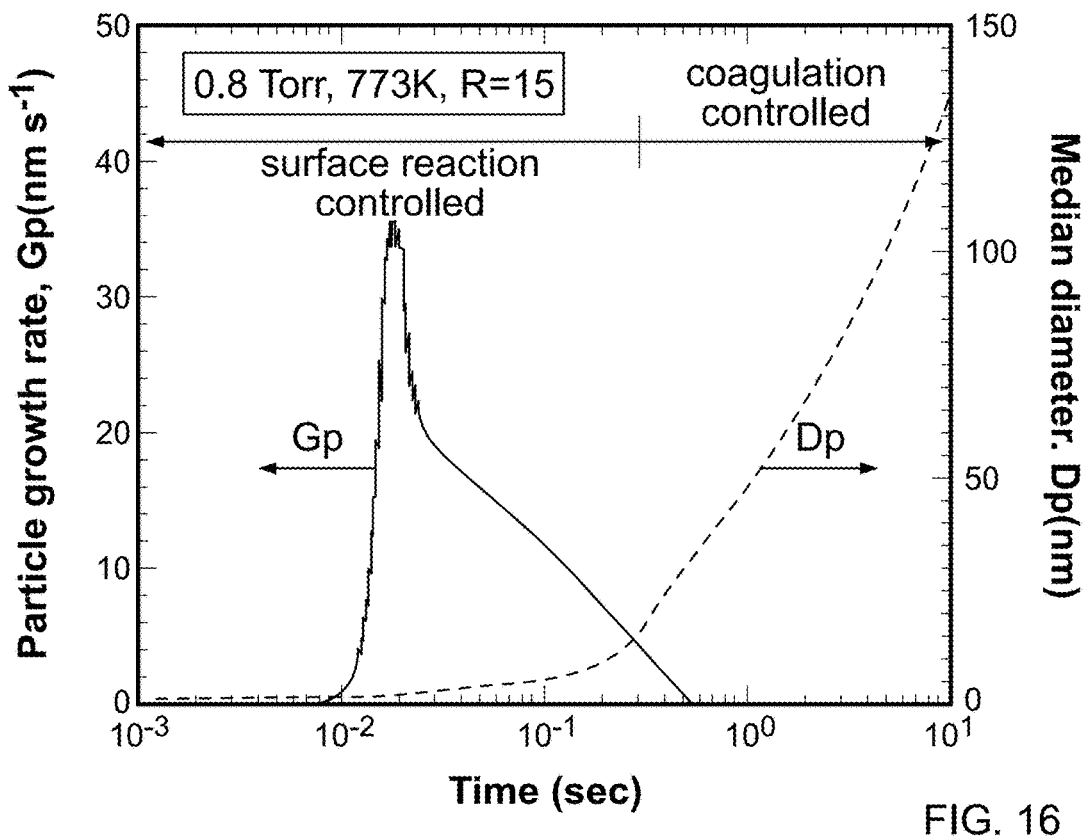
FIG. 16 is a graph depicting silicon formation of a second state of particle formation.

FIG. 16 is a graph depicting silicon formation of a second state of particle formation, particle growth. Combining this graph with determinations gained above in connection with FIGS. 14 and 15, a silicon particle may grow at a rate of approximately $$10\,\frac{nm}{s}.$$

Figure 17:
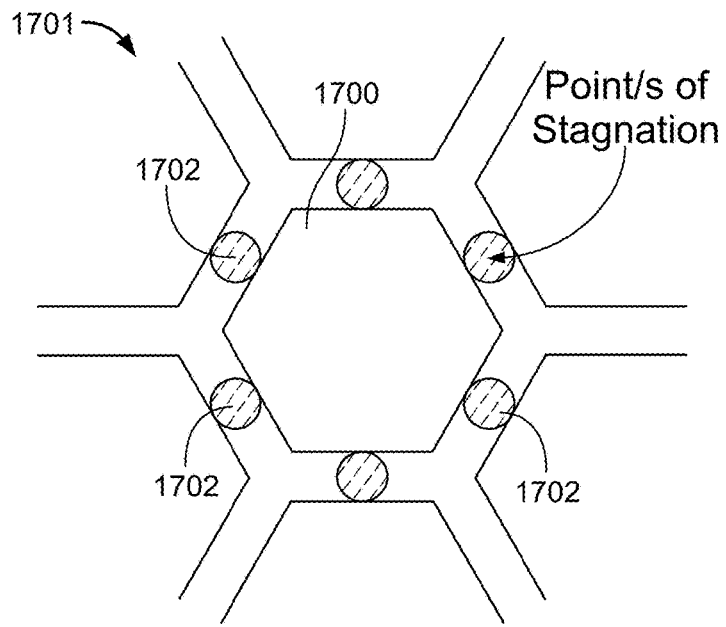
FIG. 17 is an enlarged cross-sectional view of another example channel of another example block depicting points of stagnation.

FIG. 17 is an enlarged cross-sectional view of a channel 1700 of a block 1701 with points of stagnation 1702. These points 1702 intersect with the incoming flow where the concentration of growth particles is the highest.

Figure 18:
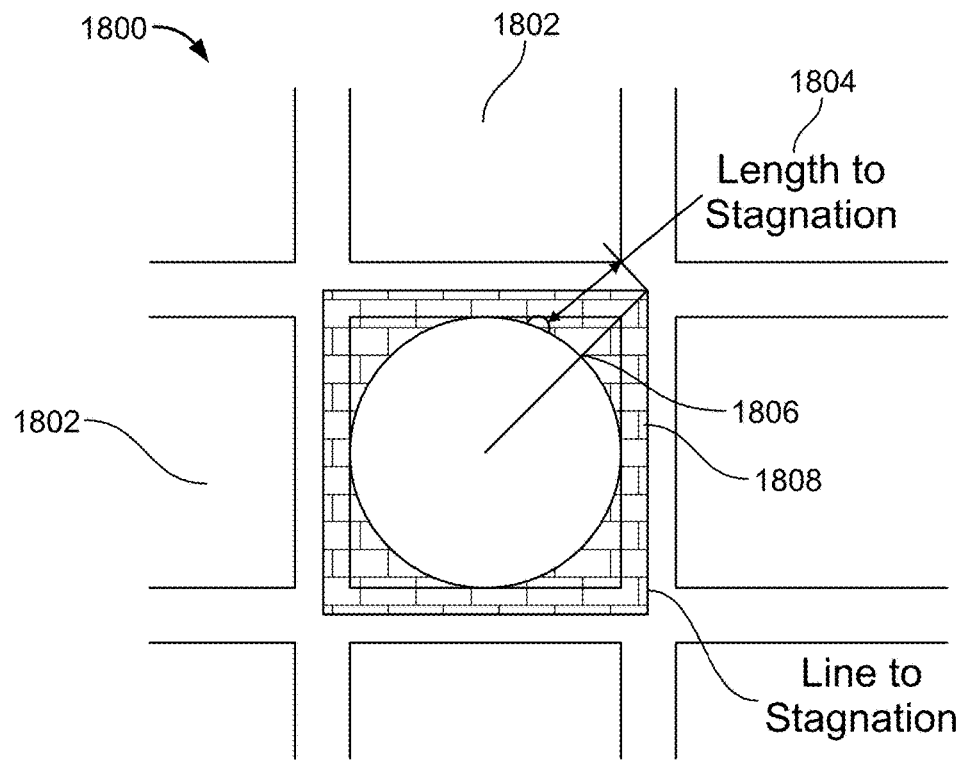
FIG. 18 is an enlarged cross-sectional view of another example block.

FIG. 18 is an enlarged cross-sectional view of a block 1800 containing channels 1802. A length to stagnation 1804 is defined as the distance from a flow area 1806 to a stagnation line 1808.

Figure 19:
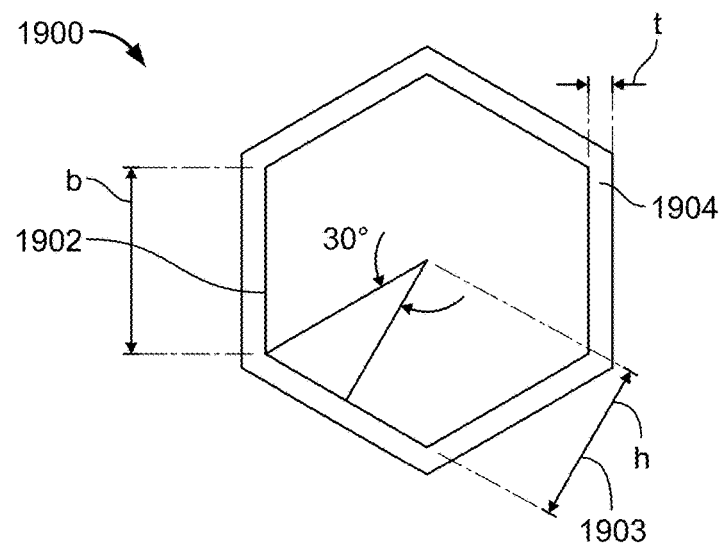
FIG. 19 is an enlarged cross-sectional view of a hexagonal structured example channel.

FIG. 19 is an enlarged cross-sectional view of a hexagonal structured channel 1900 with a side length 1902 (e.g., "b"), a distance to the center 1903 (e.g., "h"), and an inner wall thickness 1904 (e.g., "t").

Figure 20:
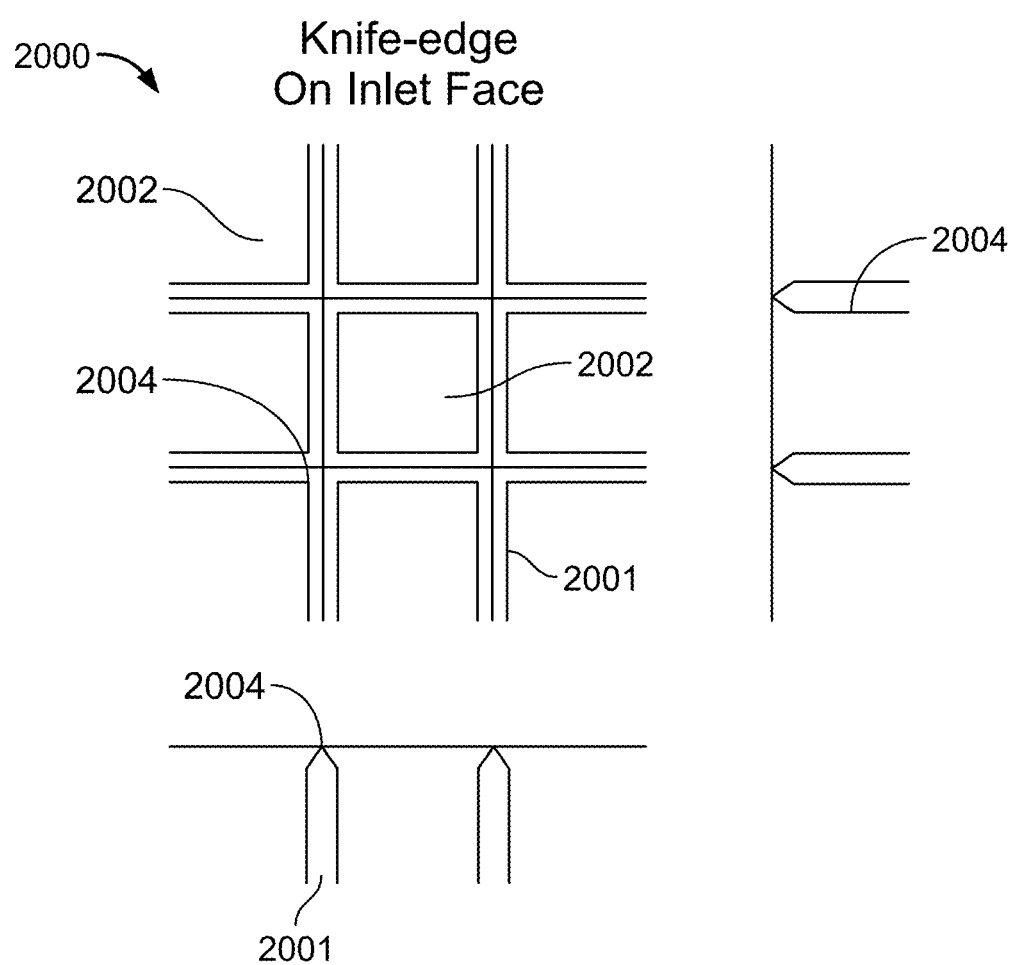
FIG. 20 depicts views of another example block illustrating possible modifications to walls surrounding channels at the inlet and/or outlet walls of the block.

FIG. 20 depicts views of a block 2000 illustrating possible modifications to walls 2001 surrounding square channels 2002 at the inlet and/or outlet walls of the block 2000. A secondary manufacturing operation may be used to form substantially sharp (e.g., knife-like) tapered edges 2004 to resist particle growth (e.g., decrease initial particle growth). Although the block 2000 is depicted as having a square channel geometry, any other appropriate geometry may be used with the sharp tapered edges 2004. Additionally or alternatively, the substantially sharp tapered edges 2004 could be manufactured into the block 2000 in a single step (e.g., during a stamping process, etc.).

FIG. 21 is a table 2100 representing the production capable design parameters found within an example block 2101 (not shown) with a width (X and Y) of 150 mm. A column 2102 represents the channel geometry. A column 2104 represents inner wall thicknesses of the block 2101. A column 2106 represents outer wall thickness of the block 2101 and a column 2108 represents the number of channels that may be placed within the block 2101 based on the shape of the channels shown in the column 2102. The square channel structures result in the least number of channels being placed into the block 2101.

FIG. 22 is a table 2200 representing resultant block data for system performance of the block 2101 of FIG. 21. A column 2202 represents the channel geometry. A column 2204 represents the corresponding flow area, a column 2206 represents a dead area of the corresponding geometry (i.e., the total cross-sectional area of all the openings in the block 2101), and a column 2208 represents a thermal effectiveness cross-sectional area (i.e., the portion of the total cross-sectional area of column 2206 taking into account an efficiency effect resulting in an effective area for transferring the heat). Combining equation 12, which will be discussed later in connection with FIG. 23, and the results of table 2200, the pressure drop of the hexagon and the circular structure is relatively less than the square structure. Therefore, the DRE of the square channel geometry is greater than that of the hexagon or the circular geometry.

Figure 23:
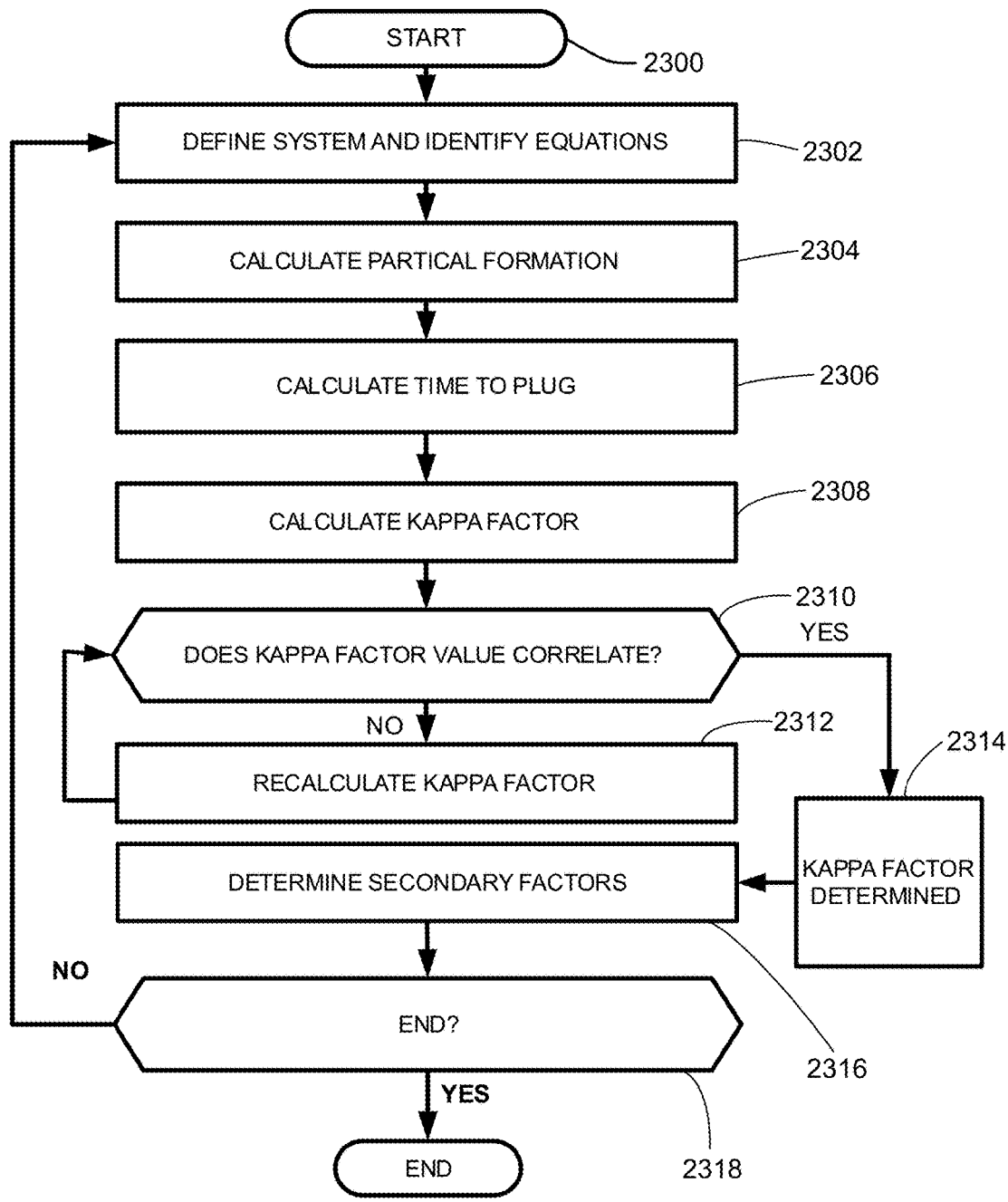
FIG. 23 is a flowchart depicting an example process that may be implemented to calculate values for plug resistance.
Figure 24:
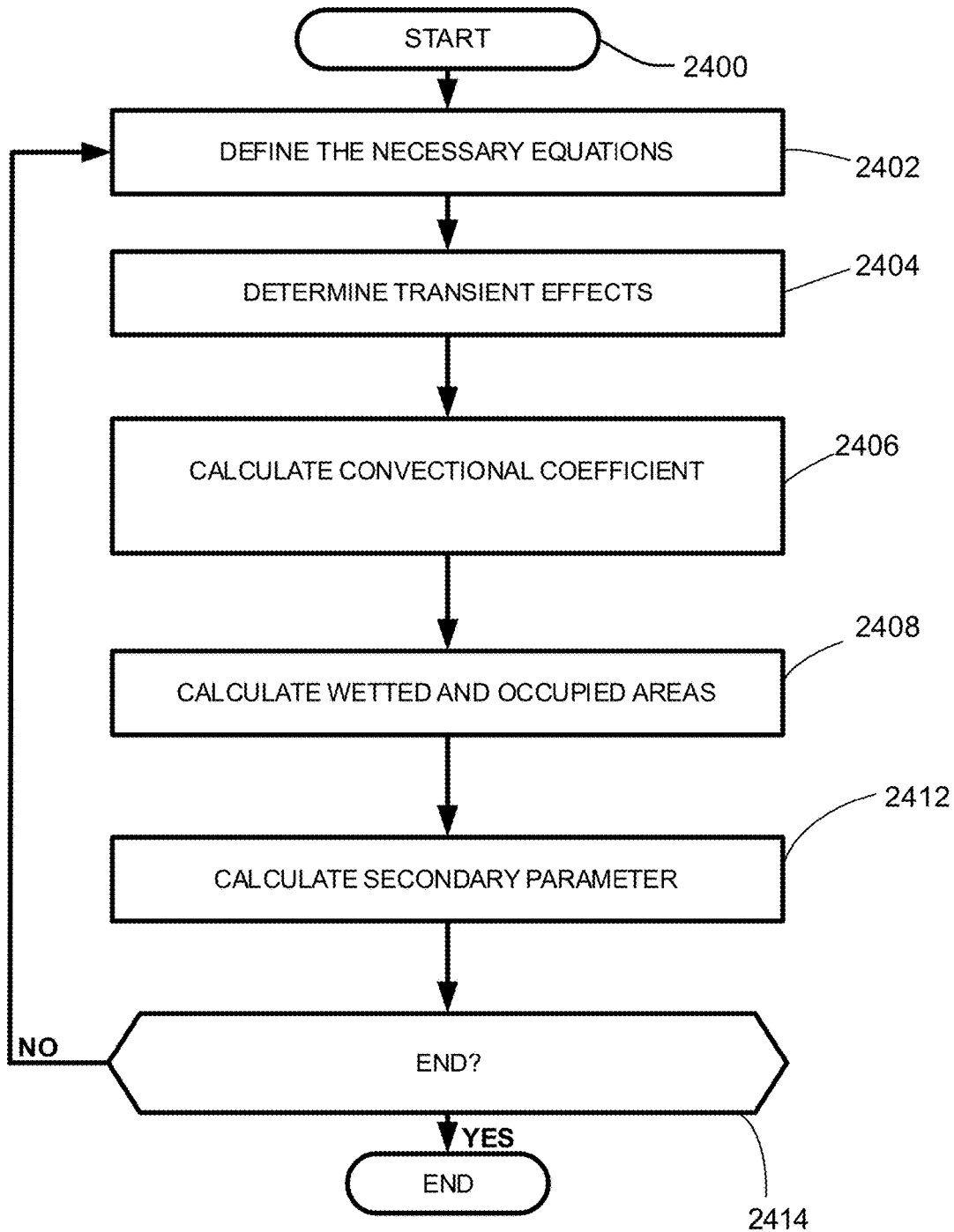
FIG. 24 is another flowchart depicting another example process that may be implemented to calculate values for thermal efficiency.

Flowcharts of representative example machine readable instructions for calculating relevant parameter values for both plug resistance and thermal efficiency are shown in FIGS. 23 and 24. In each example, the machine readable instructions comprise a program for execution by a processor such as the processor 2512 shown in the example processor platform 2500 discussed below in connection with FIG. 25. The program may be embodied in software stored on a tangible computer readable storage medium such as a CD-ROM, a floppy disk, a hard drive, a digital versatile disk (DVD), a Blu-ray disk, or a memory associated with the processor 2512, but the entire program and/or parts thereof could alternatively be executed by a device other than the processor 2512 and/or embodied in firmware or dedicated hardware. Further, although the example program is described with reference to the flowchart illustrated in FIG. 23 or 24, many other methods of implementing the calculations may alternatively be used. For example, the order of execution of the blocks may be changed, and/or some of the blocks described may be changed, eliminated, or combined.

As mentioned above, the example processes of FIGS. 23 and 24. may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 23 and 24 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable, storage device and/or storage disc and to exclude propagating signals and transmission media. As used herein, when the phrase "at least" is used as the transition term in a preamble of a claim, it is open-ended in the same manner as the term "comprising" is open ended.

FIG. 23 is a flowchart depicting an example process that may be implemented to calculate relevant parameter values for plug resistance. At the onset of this analysis, plug resistance is the main concern of this example (block 2300). However, increasing plug resistance is not necessarily exclusive of the method to increase thermal efficiency described in connection with FIG. 24 (i.e., there may be overlap in the results brought about by the analyses provided in both example processes). The plug resistance goal corresponds with secondary requirements of flow stagnation and a pressure differential. A first step in this analysis involves defining the system and identifying the relevant equations (block 2302). In this example, a pollutant flow heavily laden with silicon oxidizes within a combustion chamber and precipitates silicon dioxide, $SiO_2$. The average flow velocity through the chamber is $$1.5 \frac{m}{s}.$$

The silicon mass flow rate is $$0.1 \frac{kg}{hr}$$

or contains a chamber concentration of $$0.9 \frac{kg}{m^3 hr}.$$

The resonance time is 1.5 seconds at a temperature of 850° C.

A second step involves calculating particle formation (block 2304). Utilizing theoretical particle formations as defined by aerosol dynamics provides a basis for estimating a time to clog/plug a system. The area of stagnation and the number of stagnation points are critical to determining the time to plug. Equations 8, 9 and 11 may be used to find a channel structure which will perform within predefined system parameters. These calculations demonstrate that substantially thin walls and relatively higher flow areas prevent particle growth. This is mainly due to the thermal dynamic loads which are present within the flow. In some examples, the inner wall thickness may be limited to approximately 0.5 mm. Presuming this value as a limiting factor, the outer wall and hydraulic diameters may be defined with respect to a particular system. Additionally, particle growth is related to temperature. Within the system requirements as set forth above, a 30% reduction in temperature may correspond to a 10% reduction in particle size, which may be sufficient to resist plugging for a system. The hexagonal or circular channel structure may cool a fluid faster, thereby increasing its resistance to plugging. For an improved design block, a 30% reduction in temperature should occur within the first 300 mm of the portions 1108, 1112 (e.g., zones 3 & 4) of FIG. 11.

Equation 1 is commonly referred to as system efficiency or effectiveness. $T_{comb}$ is a combustion chamber temperature. $T_{Inlet}$ is a temperature at an inlet to the oxidizer. $T_{Outlet}$ is a temperature at an outlet of the oxidizer.

$$\varepsilon = \frac{E_{Out}}{E_{In}} = \frac{T_{Comb} - T_{Outlet}}{T_{Comb} - T_{Inlet}} \quad (1)$$

Equation 2 is a theoretical initiation of plugging at the state at which a system fails to operate in a nominal state. The flow is considered to be choked when the flow is less than 50-100% of its nominal design flow: Equation 2 has a 50% choke factor. $Q_{Nominal}$ is a nominal design flow. $\dot{m}$ is a mass flow rate. $\rho$ is an average stream density.

$$Choke/Plug \equiv Q_{Nominal} < \frac{Q_{Nominal}}{2} \quad (2)$$

$$Q_{Nominal} = \dot{m}\rho U_{Ave}$$

For equation 3, $U_{Ave}$ is an average stream velocity where $N_{Cells}$ is a number of channels.

$$U_{Ave} = \frac{Q_{Nominal}}{N_{Cells} \frac{\pi}{4} D_h^2} \quad (3)$$

Equation 4 calculates a hydraulic diameter, $D_h$. The hydraulic diameter is used often in relation to pipe or duct flow where a Reynolds-$D_h$, which is the Reynolds number with respect to the hydraulic diameter, is calculated. Its geometric equivalence is based upon flow through a tube or circular cross-section. $Area_{Cross-section}$ is a cross-sectional open area. $Perimeter_{Wetted}$ is a periphery of the channel which is exposed to the flow.

$$D_h = \frac{4(Area_{Cross-section})}{Perimeter_{Wetted}} \approx \overline{D}_h = \sqrt{\frac{4(Area_{flow})}{\pi}} \quad (4)$$

Equation 5 represents a basic form of particle diffusivity, where $$E_a \left[\frac{J}{mol}\right]$$

is an activation energy, P is a pressure [Pa], and $$V_a \left[\frac{cm^3}{mol}\right]$$

is an activation volume for diffusion. The exponential is dependent on pressure and temperature as seen in this equation.

$$D_f = D_o e^{\frac{-E_a - PV_a}{kT}} \quad (5)$$

Equation 6 represents a basic form of coalescence on the atomic scale, where $v_p$ is a particle volume, $\sigma$ is a surface tension, $D_f$ is a solid state diffusivity, and $v_o$ is a volume of diffusing species.

$$\tau_c = \frac{3kTv_p}{64\pi D_f \sigma v_o} \quad (6)$$

Equation 7 represents a pressure difference a nanoparticle would experience from the Laplace equations. $\sigma$ is the surface tension, $d_p$ is a particle diameter, $P_i$ is an internal pressure of the particle, and $P_a$ is an ambient pressure of the particle.

$$P_i - P_a = \frac{4\sigma}{d_p} \tag{7}$$

Combining equations 5, 6 and 7, a general form for the time of coalescence is obtained. Equation 8 is a basis for particle growth/formation. $d_p$ is the particle diameter [m]. $k_o$ is an oxygen to saline molar ratio $$\left[\frac{J}{\text{mol } K}\right].$$

T is the atmospheric temperature [K]. $D_o$ is an area of aerosol diffusivity constant $$\left[\frac{\text{cm}^2}{\text{s}}\right].$$

$v_o$ is the volume based on oxygen [cm$^3$]. $\lambda$ is a volume of the oxygen anion [cm$^3$]. $\sigma$ is the surface tension $$\left[\frac{J}{\text{m}^2}\right].$$

$E_a$ is the activation energy $$\left[\frac{J}{\text{molecule}}\right].$$

$V_a$ is the molar volume $$\left[\frac{\text{cm}^3}{\text{mol}}\right].$$

$P_a$ is the atmospheric pressure. There are various values for $\lambda$ and $k_o$, depending on the source as well as the activation energies with respect to the reactions that are taking place. From an analysis in this example, the time to coalesce for a particle size of 0.03 nm is 1.5 s, which means that within the system cycle time, a particle may form within the stream with an average diameter of 0.03 nm. This data suggests that a typical oxidizer will have enough resonance time to propagate particle growth. After the particle coalesces, it will grow exponentially. The coalescent points correlate to the points of stagnation seen in FIG. 17. Combining linear interpolation with the QRRK theory without taking the area of stagnation or dynamic forces into account, at $t_i$=0.5 s and $t_f$=1.5 s, a channel with an average width of 1.9 mm would take approximately one day to plug.

$$\tau_c = \frac{d_p^3 k_o T}{128 D_o \lambda \sigma v_o} e^{\left[\frac{E_a + V_a\left(P_a + \frac{4\sigma}{d_p}\right)}{k_o T}\right]} \tag{8}$$

Equation 9 represents an area of stagnation, $A_{stag}$, which is directly related to a total area, $A_{Total}$, occupied by the channel/structure and an area, $A_{Hyd}$, of the flow moving through the channel.

$$A_{stag} = A_{Total} - A_{Hyd} \tag{9}$$

Equation 10 represents an average length from the edge of the hydraulic flow to the line of stagnation. This value will vary with different designs. Mathematical arrangement optimization favors an arrangement of a circle touching six sides. This arrangement corresponds to a circular structure which has six points of contact.

$$\overline{L}_{Stag} = \frac{1}{b-a} \int_a^b y(x) dx \tag{10}$$

A third step involves calculating a time to plug (block 2306). Equation 11 represents one form to estimate the time to plug for a system. k is a system correlation factor for mapping prior data to plugging. $P_{stag}$ is a value for the points of stagnation. $\rho_{air}$ is a density of air. $\mu$ is a dynamic viscosity of the air. V is a combustion bed velocity. $t_r$ is a residence time. $\rho_{Si}$ is a density of the silicon in the chamber. In order for this equation to be valid, $A_{stag}$ must be less than $A_{hydraulic}$. The area of stagnation, $A_{stag}$, is less than the area of flow for a channel.

$$\bar{t}_{Plug} = \kappa \frac{\pi D_h^2}{4 A_{Stag}} \left(\frac{\rho_{Air}}{\mu} V^2\right) e^{\frac{-100 t_r^2 \rho_{Si}}{\kappa P_{Stag} \rho_{Air}}} \tag{11}$$

For an example where k=30 s$^2$, L(square)=0.48 mm, L(hex)=0.34 mm, L(circle)=0.34 mm, $A_{stag}$(square)=3.15 mm$^2$, $A_{stag}$ (hex)=2.73 mm$^2$, $A_{stag}$ (cir)=2.73 mm$^2$, $D_h$=2.9 mm, inner wall thickness=0.5 mm, $P_{Stag}$(square)=4, $P_{Stag}$ (hex)=6, $P_{stag}$ (circular scenario 1)=8, $P_{Stag}$ (circular scenario 2)=5, the dynamic factor $$\left(\frac{\rho V^2}{m}\right) = 0.221 \frac{10^6}{s},$$

with $L_{ave}$ for the circle=0.385 mm and $L_{ave}$ for the others=0.5 mm, the time to plugging for the square structure is 5.2 months. The time to plugging for the hexagonal structure, the circular scenario 1, and the circular scenario 2 are 6.0, 6.1 and 5.98 months respectively The octagonal structure may resist plugging for a longer period of time than the hexagonal structure and may also have increased heat transfer to the stream. Manufacturing costs for the octagonal structure may be greater than the hexagonal block. However, the octagonal block may still be the preferred structure. A factor, referred to as an infinity-clause, may cause the circular structure to fail earlier than the hexagonal structure, as seen in the circular scenario 2. When the side of the polygon is on the order of the inner wall thickness, then the infinity clause will apply if the pollutant concentration is above system tolerable levels. This condition would promote particle growth at an infinite number of points, each with an exponential growth rate.

Equation 11 illustrates that the square structure may plug relatively earlier than the hexagonal or the circular structures. Some circular structures may clog in a relatively shorter time period in comparison to the hexagonal structure because there is an infinite set of unions between a perimeter of the circle and a boundary layer of the flow. If the dynamic loads are sufficient and the infinity clause is out of scope, the circular structure in the scenario 1 will remain free from plugging for the largest amount of time. Blocks 2308, 2310, 2312, 2314 illustrate how the k factor of equation 11 must be solved reiteratively.

A fourth step involves calculating secondary parameters (block 2316). The secondary parameters include thermal convection, flow stagnation, pressure differential and/or destruction removal efficiency (DRE). Should the length or area of stagnation, from equation 10 be too large, some or all of the secondary parameters may have less-favorable values. The closer $L_{stag}$ is to the initial particle size, the longer the system will perform without being plugged. Reducing the inner wall thickness will decrease the pressure differentials and the area of stagnation. If the process tools and the manufacturing process to make the block are designed correctly, the DRE may also be reduced. The average length of stagnation may be related to the inner wall thickness which, in turn, may be related to the hydraulic diameter. The ratio between the inner wall and the hydraulic diameter affects the pressure losses of the system.

The pressure differentials may be calculated using Bernoulli's equation 12. A balance between the pressure losses and the thermal conductivity may be realized, in part, with equation 24.

$$\frac{\partial \psi}{\partial t} + \frac{u^2}{2} + \frac{P}{\rho} + gz = f(t) \quad (12)$$

Utilizing current production technology, example design parameters will be similar to those displayed in the table 2200 of FIG. 22. These example design parameters will yield the values shown in the table 2200 of FIG. 22. As seen in the table 2200 of FIG. 22 and utilizing equation 12 in a steady state, the pressure drop would be reduced with respect to the baseline example of FIG. 6 in either of the preferred designs because the flow area is greater. Equating similar system efficiencies, the DRE would also be less with the hexagonal or the circular structure.

Other structural modifications such as, but not limited to, those shown and described in connection with FIGS. 2, 5 and 19 may also be employed to improve plug resistance. As mentioned above, the kappa factor, k, in equation 11 is found by iteration (blocks 2308-2314). This factor is system dependent and will vary with respect to system process variables, such as temperature, pressure, particulate concentration and other variables.

The factors, ratios and structural designs are dependent on system parameters and/or current production capabilities. One additional factor to consider is the cost of manufacturing. Material and die costs, etc. may benefit one type of structure over another. Taking these factors into account, the hexagonal structure may be the preferred design. Hence, the plurality of channel structures would be hexagonal in appearance. The block structure, in this example, satisfies resistance to plugging, and reduces both the DRE and the pressure drop. Once these factors and the results are determined, it may be determined whether or not to proceed to another analysis with new parameters and/or variables (block 2318).

FIG. 24 is another flowchart depicting another example process that may be implemented to calculate relevant values for the goal of improved thermal efficiency (block 2400). System efficiency is the primary goal of this example or system requirement. As mentioned with FIG. 23, the goals and results of this analysis are not necessarily exclusive of the goal of plug resistance (e.g., both analyses may have an overlap of results).

The dichotomy of the system complexities are exemplified by equation 5. In order to improve the efficiency of the system, the energy out, $E_{out}$, must be maximized, while the systems total energy, $E_{in}$, is minimized. In either case, the heat transfer from the media to the air stream is crucial. For example, if there was no heat transferred between the media and the airstream, a burner would have to compensate to heat the stream up to the desired temperature. Thus, maximizing the energy that goes in and out of the stream will allow less use of the burner and, therefore, increase system efficiency. Based on these considerations, first the set of equations must be defined (block 2402).

Equation 13 represents the energy contained within the air stream including energy transferred to and from a block.

$$\bar{q}_{Air} = \dot{m}_{Air} C_p (T_{Air} - T_\infty) \quad (13)$$

Equation 14 represents the energy in a block. Note that when the block temperature reaches the air temperature, no energy is transferred. A hot combustion zone around 900° C. will affect the top 750 mm of the block with a nominal thermal conductivity value of approximately $$2 \frac{W}{mK}$$

and a cycle time of 60 s. This implies that the heat available to the stream will be relatively consistent with respect to the chamber temperature within the top 600 mm of the block.

$$\dot{q}_{Block} = k_{Block} L (T_{Air} - T_{Block}) \quad (14)$$

Equation 15 represents the heat transfer to or from a block. The average transfer of energy to or from the block is calculated by an average thermal convection coefficient, a surface area of "contact," a block temperature and a fluid temperature. The surface area of contact, $A_{surf}$ is the actual wetted surface area.

$$\bar{q}_{Trans} = h_{Ave} A_{Surf} (T_{Wall} - T_{Fluid}) \quad (15)$$

Though there are many scenarios in which the energy into the air may be maximized, this example will focus on the mass of the block. This example will consider a cycle time of 60 s, and a $D_h$ of 2.9 mm with walls 0.5 mm in average thickness. For this example, the bed heights will be 1.2 and 1.5 m. The initial conditions may assist in defining the average values for the system operational conditions. The block design may be adjusted depending upon system and/or operational considerations. This example will consider three channel morphologies including the square, the hexagon, and the circle.

Equation 16, the transient thermal convective heat transfer equation, demonstrates that as the cycle time increases, more heat is taken or given to the source, which results in lower system efficiency (block 2404). Due to the difficulties in solving this equation, this example will consider simplistic approximations for optimization.

$$\nabla^2 T = \frac{\dot{q}}{k} = \frac{\rho c_p}{k} \frac{\partial T}{\partial t} \quad (16)$$

Next, the steady-state thermal convective coefficient, $\bar{h}$, must be calculated (block 2406). Equation 17 represents the actual thermal convective heat transfer equation to solve for a typical oxidization system. Note that the constant heat flux scenario described below is not usually present in the typical thermal oxidizer where the constant heat source is the burner. However, this equation is useful in a simplistic comparison of various designs.

$$\bar{h} = \frac{1}{4} \frac{c_a Nu k_f}{l\sqrt{1-\rho_{Cell}}} \left( 1 - \frac{c_n c_w t}{l} + 2c_n n \sqrt{\frac{2k_s t\sqrt{1-\rho_{Cell}}}{c_a Nu k_f l}} \text{Tanh}\left[ \frac{c_H H}{2l} \sqrt{\frac{c_a Nu k_f l}{2k_s t\sqrt{1-\rho_{Cell}}}} \right] \right) \quad (17)$$

The average thermal convection coefficient contains channel morphology factors including $c_a$, $c_n$, $c_w$, N, l, and $\rho_{Cell}$. It is also dependent on Nussult's number, Nu, and the thermal conductivity of the fluid and the solid. Solving this equation for the three channel morphologies, demonstrates that the circular structure will have the highest heat transfer. Since the bed height is greater than 0.6 m and the heat transfer is greater, the block will transfer more heat to or from the stream. This transfer of heat reduces the outlet temperature, thereby increasing the overall system efficiency. A well-arranged circular channel structure will also have more mass.

A next step involves calculating wetted and occupied areas for the channels (block 2408). Equations 18, 19 and 20 represent the calculations for determining the wetted area of a channel structure with respect to the hydraulic diameter. The wetted area is the surface area of the channel (i.e., the total open area).

$$A_{Wetted\ Square} = D_h^2 \quad (18)$$

$$A_{Wetted\ Hex} = \frac{\sqrt{3}}{2} D_h^2 \quad (19)$$

$$A_{Wetted\ Cir} = \frac{\pi}{4} D_h^2 \quad (20)$$

Equations 21, 22 and 23 represent the area the channel structure occupies with respect to the hydraulic diameter (e.g., the occupied area of the channel).

$$A_{Occupied\ Square} = (D_h + t)^2 \quad (21)$$

$$A_{Occupied\ Hex} = \frac{\sqrt{3}}{2}(D_h + t)^2 \quad (22)$$

$$A_{Occupied\ Cir} = \frac{\sqrt{3}}{2}(D_h + t)^2 \quad (23)$$

A highly efficient arrangement for circular channel structures is one that touches on six sides, hence, the occupied area of the circular structure is substantially similar to the hexagon structure. Using these equations with optimal arrangements, the circular structure will have 8.1% more mass than the square structure and 24.8% more than the hexagon structure. This does not, however, take into account the differing number of channels for each geometry. In any case, the circular channel structure will have the most mass, the highest thermal convection coefficient and, thus, a well-arranged circular structure may have the largest system efficiency.

Among the several caveats in generating an optimal block design, the spacing between the channels and their orientation are among the most important. The time dependent equations may be step-sized and a comparative analysis may be performed utilizing the ratio between the inner wall thickness and the hydraulic diameter to compare the designs. The orientation of the hexagon and the circle are similar, however, the average wall thicknesses vary. Using these equations with an average inner wall thickness on the hexagonal structure of 0.5 mm, the optimal minimum thickness for the circular structure is 0.385 mm. Therefore, the circular structures should be spaced approximately 0.38-0.39 mm apart to substantially increase their performance. These dimensions, however, may be difficult to implement considering current manufacturing limitations. In any case, the circular channel structures should be arranged relative to one another similar to a hexagon arrangement.

The next step involves determining a secondary factor (block 2412), which includes thermal convection, flow stagnation, pressure differentials and/or DRE. Equation 24 calculates a performance factor, $I_{TP}$.

$$I_{TP} = \frac{\upsilon \rho u}{k_s} \frac{h_{Ave}}{\Delta p} \quad (24)$$

Once these factors and the results are determined, it may be determined whether or not to proceed to another analysis with new parameters and/or variables (block 2414).

The kinematic viscosity and other fluid properties are related to the thermal convection and pressure drop. This non-dimensional quantity is useful for optimizing channel densities with respect to fluid properties. With a greater $h_{Ave}$ and a smaller $\Delta p$, the circular structure may perform the most effectively if the channels are arranged appropriately.

Utilizing the fluid properties of the air and the hydrodynamic properties of the block with equation 12, it may be shown that the pressure drop will be less for a hexagonal or circular structure than with the square structure. Hence, for this example, a well packed circular structure would provide the most benefit to the system. The outer wall thickness may be two to three times greater than the inner wall thickness for manufacturing stability. The preferred outer wall thickness is identical to the inner wall thickness.

One of the preferred structures, as shown in FIG. 10B, for this example, would be of a circular form with an approximate minimum inner wall thickness of 0.385 mm and an outer wall thickness of approximately 2.0 mm. This geometry maximizes thermal transfer and mass while reducing the pressure drop across the height of the blocks. From test results, it has been estimated that 1.5 m of hexagonal-shaped channel block increases the system efficiency by approximately 1% over a similar square-channeled block. Continuing this trend, the circular-channeled block may potentially have an increase of 1.5% in system efficiency. For example, if a system has been operating with a system efficiency of 93.5% while using 1.5 m of the square-channel structured block, the circular channeled structure may achieve 95% system efficiency, which may represent a potential fuel savings of 15-25%.

Each of the example demonstrated ratios and/or variables may be used to optimize a design with respect to a desired effect or a combination of effects. For the examples described herein, system efficiency and/or plugging are very significant considerations for the system. A system analysis performed with equation 16 and FIG. 11 may relate mass and air-flow with respect to efficiency or other system performance factors. A plugging analysis depends greatly on the pollutant concentration whereas the efficiency depends greatly on how well the flow is utilized. Utilizing equations 12 and 16, and an analysis that reveals that the stagnation effect may have a 6.5% effect on the flow, the preferred ratio for thermal efficiency is $$\frac{D_H}{t_{innerwall}} \sim 0.58 - 6.53.$$

This ratio for thermal efficiency is further preferred to be from 2.58 to 5.53 and especially preferred to be from 3.58 to 4.83.

The preferred design to resist plugging is to have the wall separation as thin as possible and the $D_h$ as high as possible. Reducing the operating temperature would also resist plugging. Systems with high silicon plugging would perform significantly better with a ratio of $$\frac{D_H}{t_{innerwall}} \sim 3.47 - 19.48.$$

This ratio for plug resistance is further preferred to be from 6.47 to 16.48 and especially preferred to be from 9.58 to 13.83. As the pollutant increases in density, the hydraulic diameter also increases. Since the hydraulic diameter is much greater than $t_{wall}$, no stagnation effects are prevalent. If the open area becomes relatively large, the block may have diminished thermal effectiveness. Secondary system requirements may be applied as needed per system requirements. The tolerance range of both ratios results from current manufacturing technology and material selection.

Figure 25:
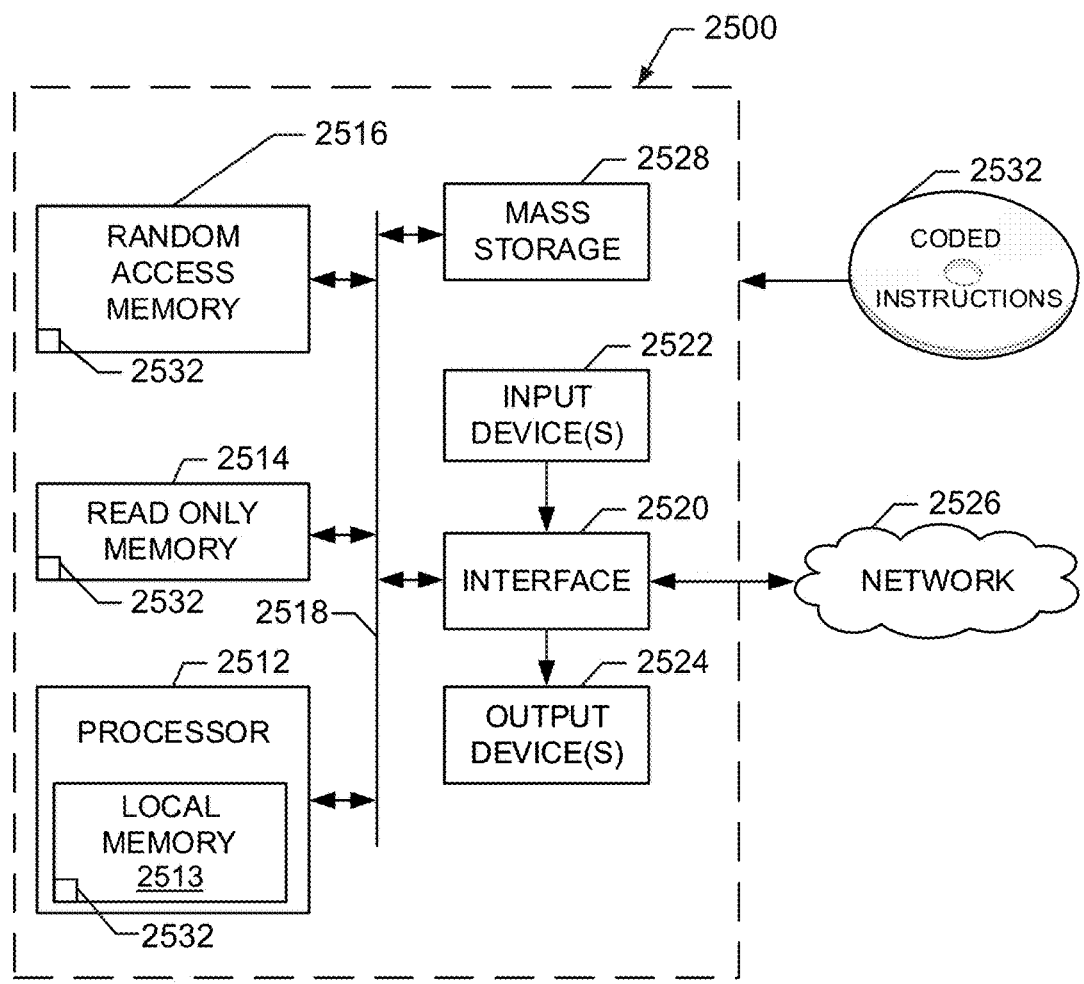
FIG. 25 illustrates an example system to implement the processes of FIGS. 23 and 24.

FIG. 25 is a block diagram of an example processor platform 2500 capable of executing the instructions of FIGS. 23 and 24. The processor platform 2500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 2500 of the illustrated example includes a processor 2512. The processor 2512 of the illustrated example is hardware. For example, the processor 2512 can be implemented by one or more integrated circuits, logic circuits, microprocessors or controllers from any desired family or manufacturer.

The processor 2512 of the illustrated example includes a local memory 2513 (e.g., a cache). The processor 2512 of the illustrated example is in communication with a main memory including a volatile memory 2514 and a non-volatile memory 2516 via a bus 2518. The volatile memory 2514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2516 may be implemented by flash memory and/or any other desired type of memory device. Access to the main memory 2514, 2516 is controlled by a memory controller.

The processor platform 2500 of the illustrated example also includes an interface circuit 2520. The interface circuit 2520 may be implemented by any type of interface standard, such as an Ethernet interface, a universal serial bus (USB), and/or a PCI express interface.

In the illustrated example, one or more input devices 2522 are connected to the interface circuit 2520. The input device(s) 2522 permit a user to enter data and commands into the processor 2512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2524 are also connected to the interface circuit 2520 of the illustrated example. The output devices 2524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 2520 of the illustrated example, thus, typically includes a graphics driver card.

The interface circuit 2520 of the illustrated example also includes a communication device such as a transmitter, a receiver, a transceiver, a modem and/or network interface card to facilitate exchange of data with external machines (e.g., computing devices of any kind) via a network 2526 (e.g., an Ethernet connection, a digital subscriber line (DSL), a telephone line, coaxial cable, a cellular telephone system, etc.).

The processor platform 2500 of the illustrated example also includes one or more mass storage devices 2528 for storing software and/or data. Examples of such mass storage devices 2528 include floppy disk drives, hard drive disks, compact disk drives, Blu-ray disk drives, RAID systems, and digital versatile disk (DVD) drives.

The coded instructions 2532 of FIGS. 23 and 24 may be stored in the mass storage device 2528, in the volatile memory 2514, in the non-volatile memory 2516, and/or on a removable tangible computer readable storage medium such as a CD or DVD.

FIG. 26 illustrates a table 2600 representative of output data shown on an output device of the example processor platform 2500 of FIG. 25 executing the example processes of FIGS. 23 and/or 24. The output table 2600 may display numerous varying Dh/t ratios in a column 2602 or any other relevant parameter. A column 2604 may represent the corresponding thermal efficiency for each configuration. A column 2606 may display another parameter such as calculated time to plugging. Another column 2608 may display a weight of the block. The output table 2600 may display multiple results of the block parameters simultaneously.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method of manufacturing a converter from a block of converter material, the method comprising:
   defining a plurality of channels within the block, the plurality of channels to extend therethrough, the plurality of channels to define a cellular pattern including at least one central channel and a plurality of surrounding channels, each central channel surrounded by five or more surrounding channels, wherein a quotient of a hydraulic diameter of all of the central channels divided by respective interior wall thicknesses between the central channels and the respective surrounding channels is to be equal to a value in a range from 0.58 to 19.48.

2. The method as defined in claim 1, wherein the converter includes a thermal oxidizer.

3. The method as defined in claim 1, wherein the converter includes a catalyst.

4. The method as defined in claim 1, further including defining segmentation on an outer wall of the block.

5. The method as defined in claim 1, further including defining slits between one or more of the interior walls between the channels to allow fluid communication between at least two of the central channel or the surrounding channels.

6. The method as defined in claim 5, wherein the slits each have a minimum width of approximately greater than or equal to one-third of thicknesses of the interior walls.

7. The method as defined in claim 1, further including defining grooves or openings within the block to allow fluid communication between at least two of the channels.

8. The method as defined in claim 7, wherein the central or surrounding openings in the block have a minimum width of approximately greater than or equal to one-third of thicknesses of the interior walls.

9. The method as defined in claim 1, further including defining tapered edges proximate one or more of an inlet end or an outlet end of the block to decrease particle growth.

10. The method as defined in claim 1, further including applying a coating resistant to silicon plugging to internal surfaces of the channels.

11. The method as defined in claim 1, wherein the quotient is to be approximately equal to a value in a range from 9.58 to 13.83.

12. The method as defined in claim 1, wherein defining the plurality of channels within the block includes extruding the block.

13. The method as defined in claim 1, wherein defining the plurality of channels within the block includes molding the block.

* * * * *